(12) United States Patent
Fujimori

(10) Patent No.: US 7,070,346 B2
(45) Date of Patent: Jul. 4, 2006

(54) IMAGE PROCESSING APPARATUS, IMAGE PROCESSING METHOD, PRINTER, PRINTING METHOD, AND PROGRAM THEREFOR

(75) Inventor: Yukimitsu Fujimori, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/972,055

(22) Filed: Oct. 22, 2004

(65) Prior Publication Data

US 2005/0220523 A1    Oct. 6, 2005

(30) Foreign Application Priority Data

Oct. 24, 2003    (JP)    ............... 2003-364733

(51) Int. Cl.
*B41J 11/44*    (2006.01)
*B41J 29/38*    (2006.01)

(52) U.S. Cl. .......................... 400/76; 347/14

(58) Field of Classification Search ............... 400/76; 347/14, 19; 358/3.06, 1.2, 3, 27
See application file for complete search history.

(56) References Cited

U.S. PATENT DOCUMENTS

| | | | |
|---|---|---|---|
| 4,748,453 A * | 5/1988 | Lin et al. | 347/41 |
| 5,684,517 A * | 11/1997 | Clemente et al. | 347/43 |
| 5,923,344 A * | 7/1999 | Norum et al. | 347/9 |
| 6,142,598 A * | 11/2000 | Iwasaki et al. | 347/9 |
| 6,170,932 B1 * | 1/2001 | Kanaya et al. | 347/41 |
| 6,547,355 B1 * | 4/2003 | Shimada et al. | 347/12 |

FOREIGN PATENT DOCUMENTS

JP    2000-261669    9/2000

OTHER PUBLICATIONS

Abstract of Japanese Patent Publication No. 2000-261669, Pub. Date: Sep. 22, 2000, Patent Abstracts of Japan.

* cited by examiner

*Primary Examiner*—Minh Chau
*Assistant Examiner*—Wasseem H. Hamdan
(74) *Attorney, Agent, or Firm*—Martine Penilla & Gencarella, LLP

(57) ABSTRACT

The image processing apparatus of the invention determines dot on-off state of respective pixels to create dots at a preset density corresponding to a tone value of image data and outputs data representing positions of dots to be created as control data to a printer. The printer creates dots according to the control data in synchronism with main scans and sub-scans of a print head to complete a printed image. The technique of the invention determines the dot on-off state according to the image data to have weighted dot distribution in a direction different from the scanning direction of the print head. Positional misalignment of dot formation generally occurs in the scanning direction of the print head. The weighted dot distribution in the direction different from the scanning direction of the print head thus does not significantly affect the resulting picture quality even in the event of some positional misalignment of dot formation and ensures a high-quality printed image.

10 Claims, 22 Drawing Sheets

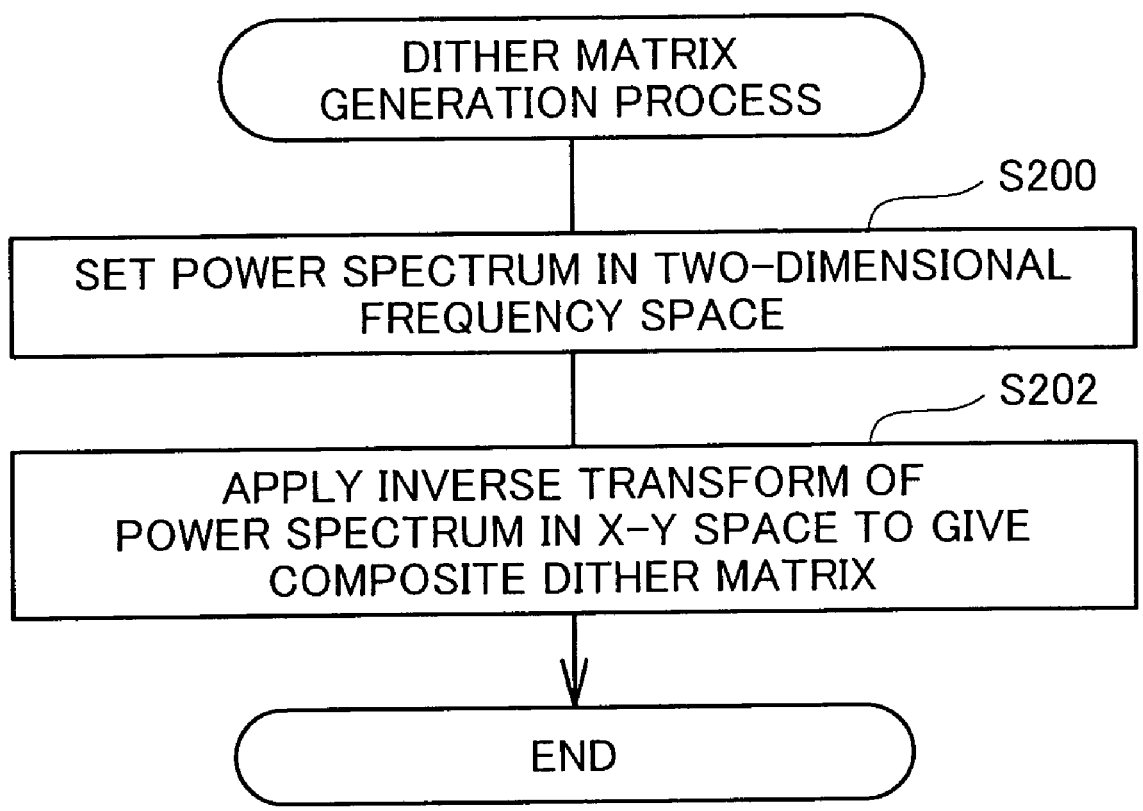

Fig.20A

| | * | 1/4 |
|---|---|---|
| 1/8 | 1/8 | 1/8 |
| 1/16 | 1/8 | 1/16 |

Fig.20B

| | | * | 1/4 | 1/8 |
|---|---|---|---|---|
| 1/16 | 1/16 | 1/4 | 1/32 | 1/32 |
| | | 1/8 | | |
| | | 1/16 | | |

Fig.20C

| | | * | 1/4 | |
|---|---|---|---|---|
| 1/8 | 1/8 | 1/4 | 1/8 | 1/8 |

Fig.20D

| | * | 1/8 |
|---|---|---|
| 1/8 | 1/4 | 1/16 |
| 1/16 | 1/8 | 1/16 |
| | 1/8 | |
| | 1/16 | |

Fig.21
| Tone Value | Dot Pattern | Tone Value | Dot Pattern |
|---|---|---|---|
| 1 | 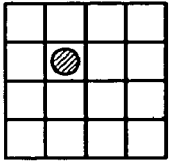 | 9 | 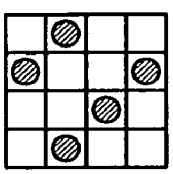 |
| 2 | 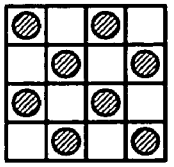 | 10 | 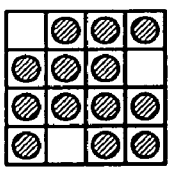 |
| 3 | 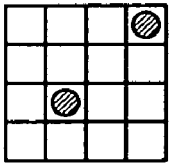 | 11 | 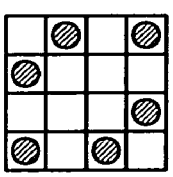 |
| 4 | 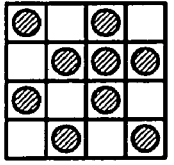 | 12 | 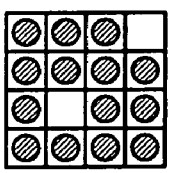 |
| 5 | 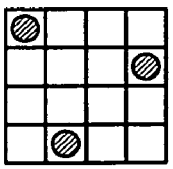 | 13 | 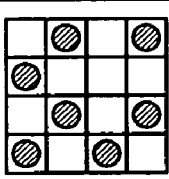 |
| 6 | 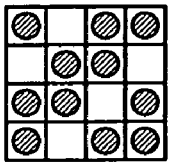 | 14 | 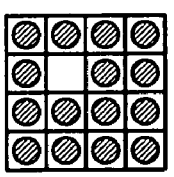 |
| 7 | 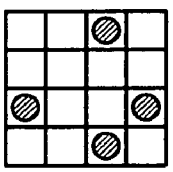 | 15 | 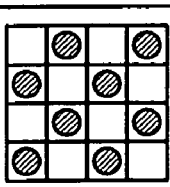 |
| 8 | 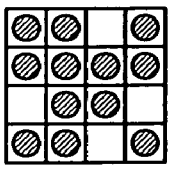 | 16 | 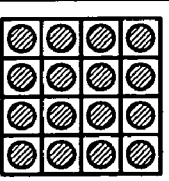 |

IMAGE PROCESSING APPARATUS, IMAGE PROCESSING METHOD, PRINTER, PRINTING METHOD, AND PROGRAM THEREFOR

TECHNICAL FIELD

The present invention relates to a technique of creating dots on a printing medium to complete a printed image. More specifically the invention pertains to a technique of executing a preset series of image processing to convert image data into data representing the dot on-off state in respective pixels and thereby print a processed image.

BACKGROUND ART

Printing devices that create dots on printing media to give printed images have widely been used as an output device of images generated by computers and of images taken by digital cameras. The printing device creates dots at adequate densities corresponding to the tone values of image data to give a printed image. For dot formation at the adequate densities corresponding to the tone values, an object image to be printed goes through a series of image processing, which converts image data into data of dot distribution. The converted data of dot distribution ensures dot formation on the printing medium at the adequate densities corresponding to the tone values and accordingly gives a desired printed image. Diverse techniques, for example, an error diffusion method, a systematic dither method, and other various dither methods, are applicable to such image processing.

Individual dots created on the printing medium by the printing device are sufficiently small in size and are not visually recognizable in a normal state. A block of multiple dots created at close positions to one another may, however, be made rather conspicuous and undesirably worsen the printing quality. Diverse image processing techniques have been devised and proposed to attain even dot distribution, as well as to ensure dot formation at the adequate densities corresponding to the tone values of the image data. One of such techniques is disclosed in Japanese Patent Laid-Open Gazette No. 2000-261669.

The printing device successively creates dots to complete a printed image, while moving a print head relative to a printing medium. A positioning error of the print head or poor accuracy of main scan or sub-scan may result in positional misalignment of dot formation. The positional misalignment of dot formation actually creates multiple dots at close positions, regardless of the even dot distribution at the step of image processing, and thereby undesirably worsens the printing quality.

The heightened dot positioning accuracy, for example, the lowered positioning error of the print head, naturally prevents such deterioration of the printing quality. The lowered positioning error, however, remarkably increases the labor and the time required for regulation and adjustment. This time-consuming countermeasure causes other problems, that is, the raised total cost and the lowered printing speed.

DISCLOSURE OF THE INVENTION

The object of the invention is thus to eliminate the drawbacks of the prior art discussed above and to provide a technique of preventing significant deterioration of the picture quality even in the event of some positional misalignment of dot formation and ensuring a high-quality printed image.

In order to attain at least part of the above and the other related objects, the present invention is directed to an image processing apparatus that processes image data of multiple pixels constituting an image. The image processing apparatus includes: a dot on-off setting module that determines dot on-off state in each pixel of the image to create dots at a preset density corresponding to a tone value of the image data in such a manner that a distribution of dots is to be weighted in a specific direction, which is different from a direction of raster lines aligned as arrays of dots; and a data supply module that supplies data representing positions of dots to be created as control data for dot formation to a printing module that actually creates dots.

There is an image processing method corresponding to the image processing apparatus of the invention. The invention is accordingly directed to an image processing method that processes image data of multiple pixels constituting an image. The image processing method includes the steps of: determining dot on-off state in each pixel of the image to create dots at a preset density corresponding to a tone value of the image data; setting a distribution of dots to be weighted in a specific direction that is different from a direction of raster lines aligned as arrays of dots; and supplying data representing positions of dots to be created as control data for dot formation to a printing module that actually creates dots.

The image processing apparatus and the corresponding image processing method of the invention make an object image to be printed go through a preset series of image processing, so as to create dots at preset densities corresponding to tone values of the image data. The dot distribution is weighted in the specific direction different from the direction of the raster lines. In the printing module equipped with a print head for dot formation, the 'direction of the raster lines' is equivalent to a 'direction of relative motion of the print head to a printing medium'. The terminology 'relative motion of the print head to the printing medium' is not restricted to moving the print head relative to the stationary printing medium but includes moving the printing medium relative to the stationary print head, as well as simultaneously moving the print head and the printing medium relative to each other.

Positional misalignment of dot formation in the image printing process generally arises in the direction of raster lines (for example, the direction of the relative motion of the print head to the printing medium). The presence of other dots that are placed rather close to the misaligned dots deviated from the expected positions and are aligned in the direction of raster lines often worsens the resulting picture quality. The presence of other dots that are placed rather close to the misaligned dots deviated from the expected positions but are aligned in a direction different from the direction of the raster lines (for example, a scanning direction of the print head), however, does not significantly worsen the resulting picture quality. In the process of dot generation according to the tone values of the image data, weighted distribution of dots in the direction different from the direction of the raster lines (the direction of the relative motion of the print head to the printing medium) results in sparser dot distribution in the direction of the raster lines. This arrangement thus effectively prevents deterioration of the resulting picture quality even in the event of positional misalignment of dot formation.

The image processing apparatus of the invention may reduce a dot-on rate in a direction of relative motion of the print head to the printing medium, so as to attain uneven dot distribution. The image processing apparatus of the invention may attain weighted dot distribution in a direction of approximately 45 degrees from a direction of relative motion of the print head to the printing medium.

Either of the reduced dot-on rate or the weighted dot distribution causes sparser dot distribution in the direction of the relative motion of the print head to the printing medium. This arrangement thus effectively prevents deterioration of the resulting picture quality even in the event of positional misalignment of dot formation.

The image processing apparatus of the invention may apply a dither method to the image data for dot generation.

An adequately designed dither matrix as discussed later enables the dither method to attain weighted dot distribution in the direction different from the direction of the relative motion of the print head to the printing medium. The image processing apparatus of this arrangement thus ensures the stable picture quality even in the event of some positional misalignment of dot formation, while applying the dither method to promptly create dots and complete a resulting printed image.

In the application of the dither method, the dither matrix controls the characteristics of dot generation. The use of the adequately designed dither matrix in the dither method can thus attain weighted dot distribution in the direction different from the direction of the relative motion of the print head to the printing medium. Another application of the invention is accordingly a dither matrix. The present invention is thus directed to a dither matrix that includes threshold values set to have a weight in a specific direction different from a direction of relative motion of the print head to the printing medium, as well as a corresponding method of setting such a dither matrix.

The image processing apparatus of the invention may alternatively apply an error diffusion method to the image data for dot generation.

An adequately designed error diffusion matrix as discussed later enables the error diffusion method to attain weighted dot distribution in the direction different from the direction of the relative motion of the print head to the printing medium. Dot generation by the error diffusion method ensures a high-quality printed image. The image processing apparatus of this arrangement thus preferably enables a high-quality image to be stably printed even in the event of some positional misalignment of dot formation.

In the application of the error diffusion method, the fractions of error diffusion into unprocessed peripheral pixels or the settings of weighting factors in the respective peripheral pixels control the characteristics of dot generation. Setting the weighting factors for error diffusion in the error diffusion method can thus attain weighted dot distribution in the direction different from the direction of the relative motion of the print head to the printing medium. Another application of the invention is accordingly an error diffusion matrix including weighting factors set in the above manner. The present invention is thus directed to an error diffusion matrix that includes weighting factors, which are used for error diffusion in the error diffusion method and are set to have a weight in a specific direction different from a direction of relative motion of the print head to the printing medium.

A printing device creates dots on a printing medium according to the dot on-off state of the respective pixels determined by the image processing apparatus discussed above. The technique of the invention is accordingly actualized by a printing device and a corresponding printing method. The invention is thus directed to a printing device that prints an image. The printing device includes: a dot formation module that drives and moves a print head relative to a printing medium and accordingly creates dots forming raster lines on the printing medium; an image data receiving module that receives image data representing tone values set in respective pixels constituting the image; a dot on-off setting module that determines dot on-off state in each pixel to create dots at a preset density corresponding to a tone value of the image data in such a manner that a distribution of dots is to be weighted in a specific direction different from a direction of the relative motion of the print head to the printing medium; and a dot data supply module that supplies dot data representing positions of dots to be created to the print head.

There is a printing method corresponding to the printing device of the invention. The present invention is thus directed to a printing method that prints an image. The printing method includes the steps of receiving image data representing tone values set in respective pixels constituting the image; determining dot on-off state in each pixel to create dots at a preset density corresponding to a tone value of the image data; setting a distribution of dots to be weighted in a specific direction that is different from a direction of relative motion of a print head to a printing medium; supplying dot data representing positions of dots to be created to the print head; and driving the print head to create dots on the printing medium and thereby complete the image.

The printing device and the corresponding printing method of the invention set the weighted dot distribution in the specific direction different from the direction of the relative motion of the print head to the printing medium in the process of generating dots according to the image data. While moving the print head relative to the printing medium, the printing device or the printing method actually creates dots on the printing medium according to the preset dot distribution, so as to complete a printed image.

This arrangement ensures sparser dot distribution in the direction of the relative motion of the print head, thus effectively preventing deterioration of the resulting picture quality even in the event of positional misalignment of dot formation and assuring a high-quality printed image.

A computer may read a computer program that actualizes either the image processing method or the printing method to execute the required functions of the invention discussed above. Other applications of the invention are accordingly such a computer program and a recording medium in which the computer program is recorded.

The computer program of the invention read by the computer to execute the respective functions desirably prevents deterioration of the resulting picture quality even in the event of some positional misalignment of dot formation on the printing medium and ensures a high-quality printed image.

BRIEF DESCRIPTION OF THE DRAWINGS

FIG. 14 is a flowchart showing a process of generating a specifically designed dither matrix to attain uneven dot distribution;

FIGS. 20A through 20D show error diffusion matrixes;

FIG. 21 shows a mapping of tone values of pixels to dot patterns; and

BEST MODES OF CARRYING OUT THE INVENTION

Figure 1:
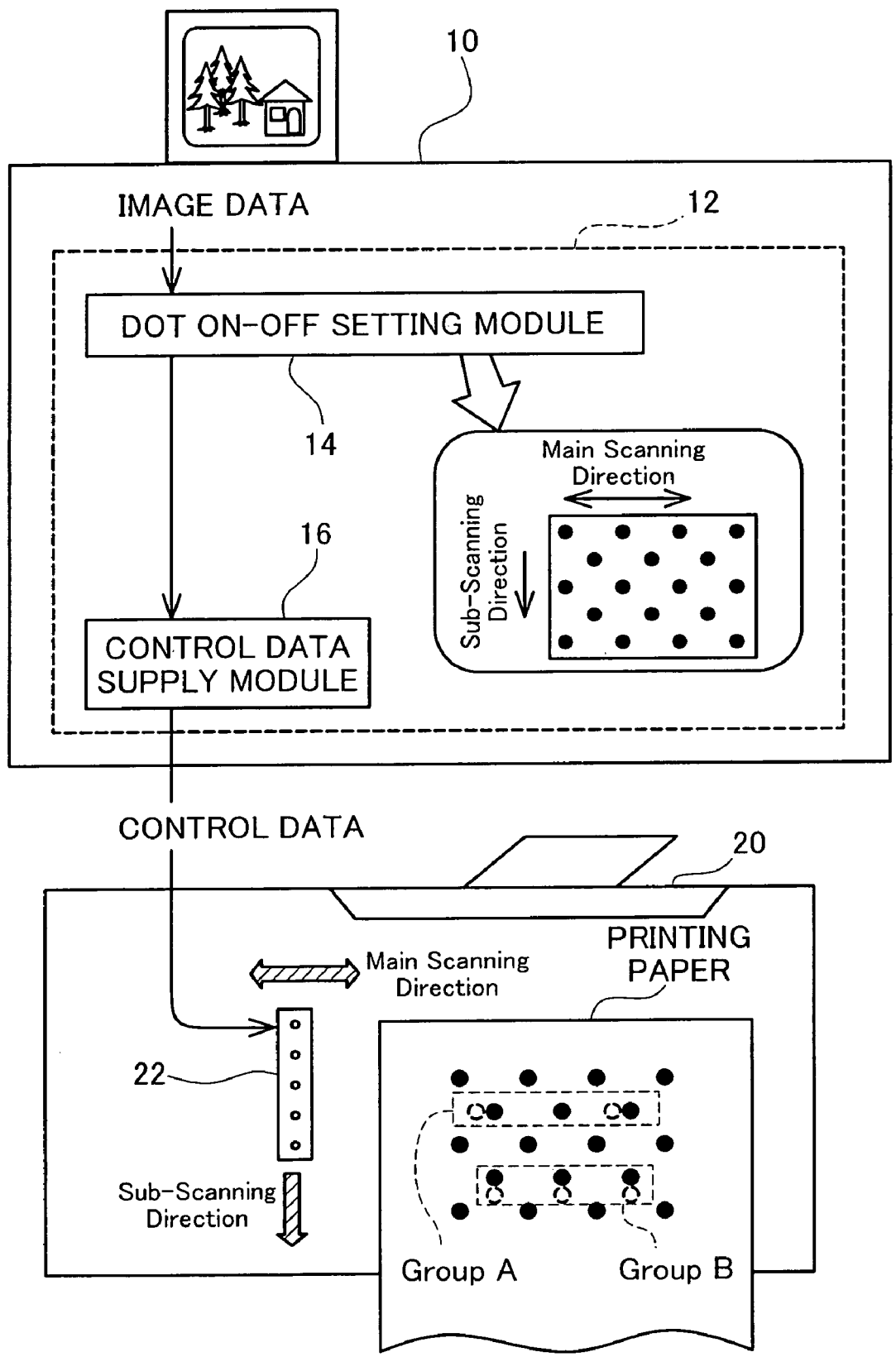
FIG. 1 schematically illustrates the configuration of a printing system including an image processing device as an embodiment of the invention.

One mode of carrying out the invention is discussed below as a preferred embodiment in the following sequence to describe the objects, features, aspects, and advantages of the present invention more apparently:
A. Outline of System
B. Device Configuration
C. Outline of Image Processing
D. Dot On-Off Setting Process
E. Dither Matrix Generation Process
F. Modifications
  F-1. First Modified Example
  F-2. Second Modified Example
  F-3. Third Modified Example
  A. Outline of System The outline of a system embodying the invention is described with reference to FIG. 1, prior to detailed description of an embodiment. FIG. 1 schematically illustrates the configuration of a printing system including an image processing device as an embodiment of the invention. The illustrated printing system includes a computer 10 as an image processing device in combination with a printer 20 to function as an integral unit. The computer 10 receives image data of an object image to be printed, executes a preset series of image processing to convert the received image data into data representing the dot on-off state in respective pixels of the object image, and supplies the dot on-off state data as control data to the printer 20. A dedicated software program called a printer driver 12 executes the conversion of image data into the dot on-off state data.

The printer 20 creates dots on printing paper according to the control data supplied from the computer 10. The printer 20 is equipped with a print head 22 and forms dots at adequate positions on the printing paper while shifting the print head 22 relative to the printing paper. In the illustrated printing system of FIG. 1, the print head 22 is actuated to create dots while being shifted both in a main scanning direction and in a sub-scanning direction perpendicular to each other. Formation of dots by the scanning print head 22 on the printing paper according to the control data completes a resulting printed image.

In the illustrated printing system that prints an image by formation of dots on the printing paper, an appropriate series of image processing is essential to form dots at adequate positions and thereby give a high-quality printed image. Since the print head 22 of the printer 20 creates dots during its scan, the positions of dot formation may be misaligned in the scanning direction of the print head 22. The misaligned positions of dot formation cause the poor printing quality even under the conditions of optimum image processing. There are several possible measures to reduce the potential misalignment of the positions of dot formation to a level that does not significantly affect the printing quality; for example, the technique of controlling the scans of the print head 22 and the feed of printing paper with high accuracy and providing individual regulation mechanisms. These measures, however, cause other problems, such as the complicated structure, the size growth, and the manufacturing cost increase of the printing device.

In order to prevent such positional misalignment of dot formation, the printer driver 12 of the printing system includes a dot on-off setting module 14 and a control data supply module 16 as shown in FIG. 1. The dot on-off setting module 14 makes input image data go through a preset series of image processing and determines the dot on-off state in each of pixels constituting a resulting image, so as to create dots at specific densities corresponding to the tone values of the image data. The control data supply module 16 supplies data representing the positions of dots to be created as control data to the printer 20. The dot on-off setting module 14 intentionally biases a dot distribution in preset directions, which are different from the main scanning direction and from the sub-scanning direction of the print head 22, in the process of determining dot on-off state according to the tone values of the image data.

FIG. 1 also conceptually shows dot on-off setting by the dot on-off setting module 14. In the illustrated example, the dot-on rate is approximately 1 to 8 pixels. Each dot is closer to adjoining dots in directions of 45 degrees from the main scanning direction and from the sub-scanning direction than adjoining dots in the main scanning direction and in the subs-scanning direction. Namely the densities of dot generation in the main scanning direction and in the sub-scanning direction are sparser than the densities of dot generation in the directions of 45 degrees from the main scanning direction and from the sub-scanning direction. This weights the dot distribution in the directions of 45 degrees from the main scanning direction and from the sub-scanning direction. The printer 20 shown in FIG. 1 creates dots on the printing paper corresponding to the control data representing the uneven dot distribution.

The printer 20 creates dots while relatively shifting the print head 22 in both the main scanning direction and the sub-scanning direction. The positions of dot formation may thus be misaligned in the main scanning direction or in the sub-scanning direction. Broken circles of FIG. 1 denote misaligned dots on the printing paper. The positions of dot formation are misaligned in the main scanning direction in a group A, whereas the positions of dot formation are misaligned in the sub-scanning direction in a group B. The weighted dot distribution in the directions different from the main scanning direction and from the sub-scanning direction effectively reduces the adverse effects of misaligned dot positions in the main scanning direction or in the sub-scanning direction on the picture quality. The uneven dot distribution technique generates dots at lower densities in the main scanning direction and in the sub-scanning direction than the densities in the directions of 45 degrees from the main scanning direction and from the sub-scanning direction. The adjoining dots are farther from each other in the main scanning direction and in the sub-scanning direction, even in the event of slight positional misalignment of dot formation in the main scanning direction (as in the case of the group A in FIG. 1) or in the event of slight positional misalignment of dot formation in the sub-scanning direction (as in the case of the group B in FIG. 1). This technique thus reduces the adverse effects of the positional misalignment on the picture quality and thus stably gives a high-quality printed image, as discussed later in detail. The image processing device of the invention that adopts this technique and the corresponding image processing method are described in detail with reference to one preferred embodiment.

B. Device Configuration

Figure 2:
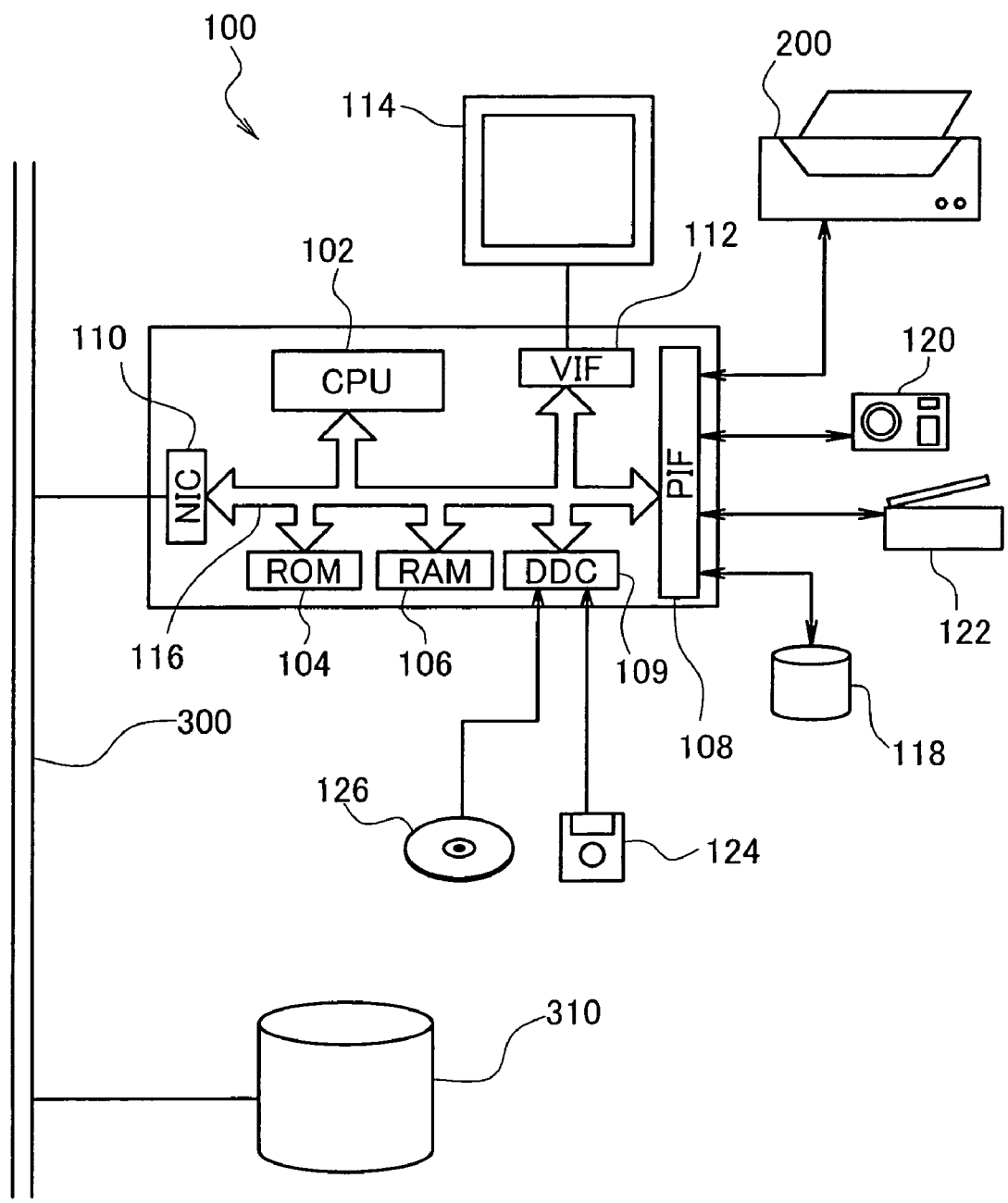
FIG. 2 schematically illustrates the configuration of a computer functioning as an image processing device in one embodiment of the invention.

FIG. 2 schematically illustrates the configuration of a computer 100 functioning as an image processing device in one embodiment of the invention. The computer 100 includes a CPU 102, a ROM 104, and a RAM 106, which are interconnected via a bus 116. The computer 100 has a disk controller DDC 109 used to read data from a flexible disk 124 and a compact disk 126, a peripheral equipment interface PIF 108 used to receive and transmit data from and to peripheral equipment, and a video interface VIF 112 used to actuate a CRT 114. A hard disk 118 and a printer 200 (discussed below) are connected to the PIF 108. Connection of a digital camera 120 or a color scanner 122 to the PIF 108 enables images taken by the digital camera 120 or the color scanner 122 to be printed by the printer 200. Insertion of a network interface card NIC 110 into the computer 100 enables the computer 100 to establish connection with a communication line 300 and fetch storage data from a storage device 310 linked to the communication line 300.

Figure 3:
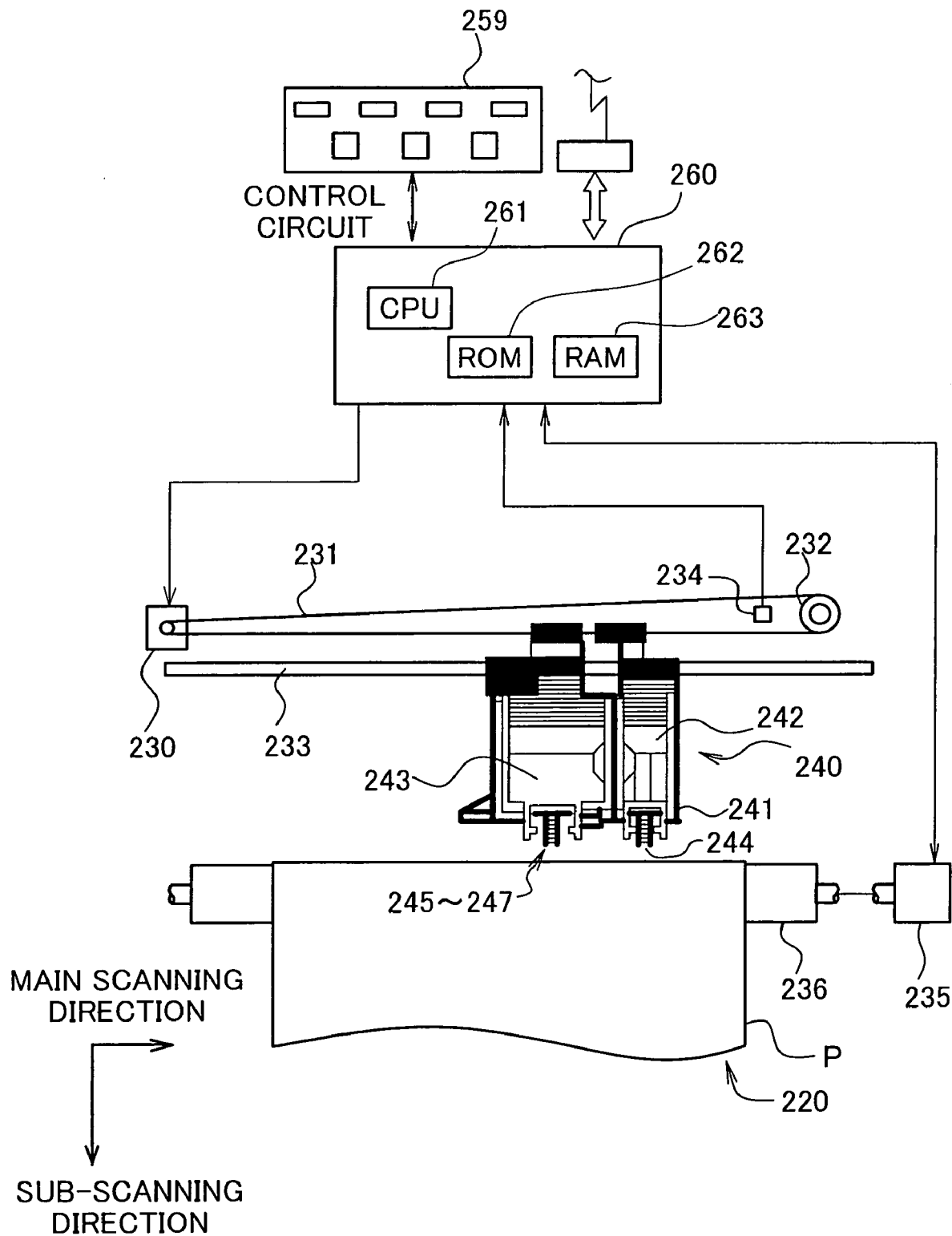
FIG. 3 schematically illustrates the structure of a printer in the embodiment.

FIG. 3 schematically illustrates the structure of the printer 200 in this embodiment. The printer 200 is a color inkjet printer that is capable of creating dots of four color inks, cyan, magenta, yellow, and black. The color inkjet printer may be capable of creating dots of totally six color inks, which include light cyan ink having a lower dye density or pigment density and light magenta ink having a lower dye density or pigment density, in addition to the above four color inks. In the description below, cyan ink, magenta ink, yellow ink, black ink, light cyan ink, and light magenta ink may be expressed simply as C ink, M ink, Y ink, K ink, LC ink, and LM ink, respectively.

As illustrated, the color printer 200 has a mechanism of actuating a print head 241 mounted on a carriage 240 to eject inks and create dots, a mechanism of activating a carriage motor 230 to move the carriage 240 back and forth along the axis of a platen 236, a mechanism of activating a paper feed motor 235 to feed printing paper P, and a control circuit 260 that controls the formation of dots, the shift of the carriage 240, and the feed of the printing paper P.

An ink cartridge 242 for storing the K ink and another ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241. The ink ejection heads 244 through 247 of the respective colors eject ink droplets of the supplied color inks to create ink dots on a printing medium.

The control circuit 260 includes a CPU, a ROM, a RAM, a peripheral equipment interface PIF, and a D-A converter that converts digital data into analog signals. One possible modification may replace the CPU with a hardware or firmware structure to exert the required functions. The control circuit 260 controls the operations of the carriage motor 230 and the paper feed motor 235 to regulate main scans and sub-scans of the carriage 240. The control circuit 260 also actuates the print head 241 to eject ink droplets at adequate timings in synchronism with the main scans and the sub-scans of the carriage 240. The ink ejection heads 244 through 247 of the respective colors eject ink droplets at the adequate timings under control of the control circuit 260, so as to create ink dots on the printing paper P and print a resulting color image.

Any of diverse methods may be applied to eject ink droplets from the ink ejection heads of the respective colors. The available techniques include a method that uses piezoelectric elements for ejection of ink droplets and a method that uses heaters located in respective ink conduits to make bubbles in the ink conduits for ejection of ink droplets. The technique of the invention is not restricted to the inkjet printers that eject inks, but is also applicable to printers that take advantage of thermal transfer to create ink dots on a printing medium and printers that take advantage of static electricity to make toners of respective colors adhere to a printing medium.

Figure 4:
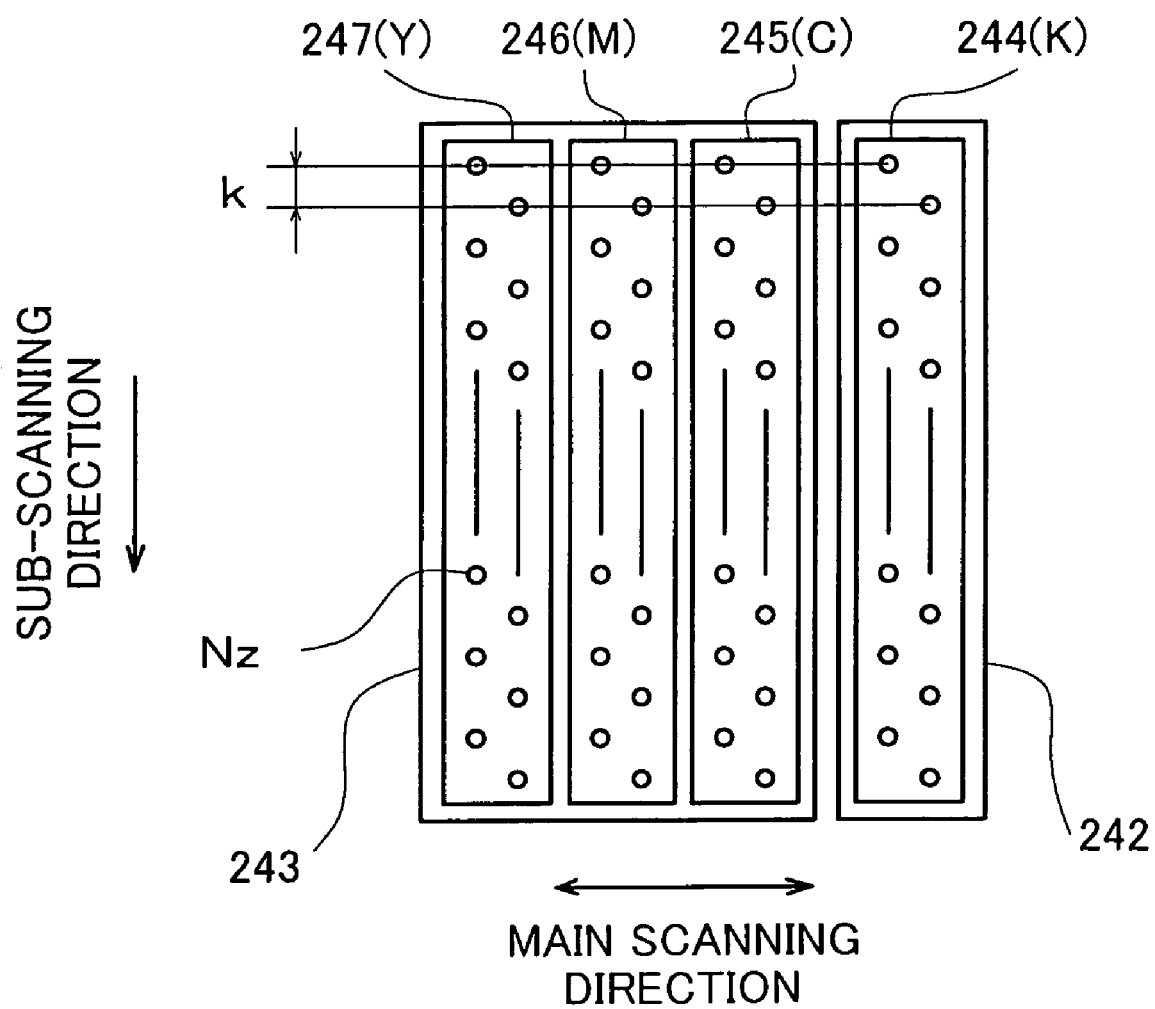
FIG. 4 shows an arrangement of multiple nozzles formed in bottom faces of ink ejection heads of respective colors to eject ink droplets of the corresponding colors.

FIG. 4 shows an arrangement of multiple nozzles Nz formed in bottom faces of the ink ejection heads 244 through 247 of the respective colors to eject ink droplets of the corresponding colors. As illustrated, four nozzle arrays for ejecting ink droplets of the respective color inks are formed on the bottom faces of the respective ink ejection heads 244 through 247. Each nozzle array includes 48 nozzles Nz arranged in zigzag at a fixed nozzle pitch 'p'. These nozzles are activated under control of the control circuit 260 to eject ink droplets and thereby create ink dots on the printing paper.

In the color printer 200 having the hardware configuration discussed above, the carriage motor 230 is driven to move the ink ejection heads 244 through 247 of the respective colors in a main scanning direction relative to the printing paper P, while the paper feed motor 235 is activated to feed the printing paper P in a sub-scanning direction. The control circuit 260 repeats main scans and sub-scans of the carriage 240 and drives nozzles at adequate timings to eject ink droplets. This creates ink dots at required positions to print a resulting image on the printing paper P.

C. Outline of Image Processing

Figure 5:
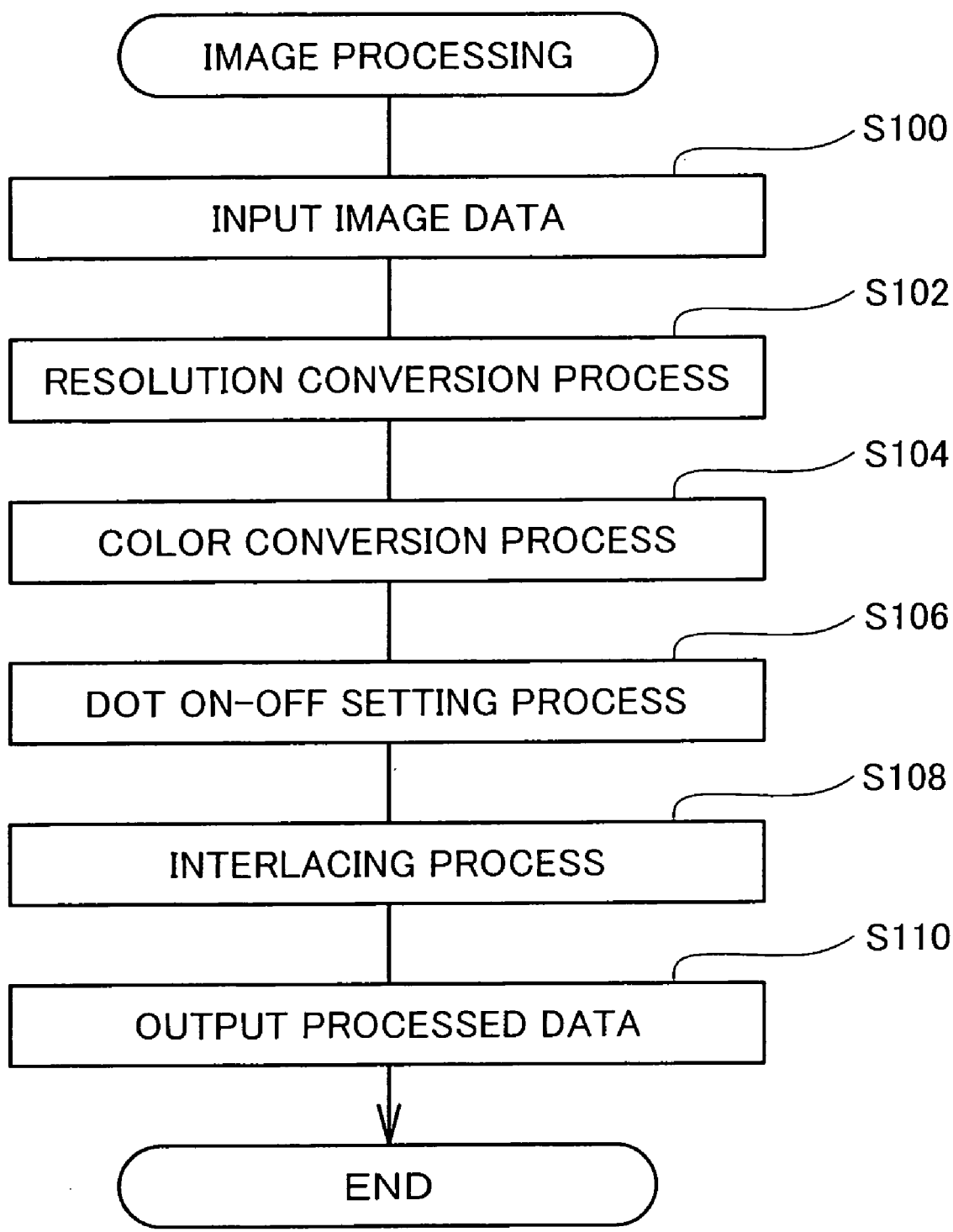
FIG. 5 is a flowchart showing a series of image processing to execute image processing of an input image, generate control data, and supply the generated control data to the printer.

FIG. 5 is a flowchart showing a preset series of image processing executed by the computer 100 to convert an object image to be printed into data representing the dot on-off state in respective pixels of the image and supply the converted data as control data to the printer 200. The series of image processing executed in this embodiment is described below with reference to the flowchart of FIG. 5.

In the image processing flow, the computer 100 starts reading object image data to be converted (step S100). The object image data is RGB color image data in this embodiment, although monochromatic image data may be replaced with the color image data.

The input image data goes through a resolution conversion process (step S102). The resolution conversion process converts the resolution of the input image data into a resolution adopted by the printer 200 to print an image (printing resolution). When the printing resolution is higher than the resolution of the input image data, the resolution conversion process performs interpolation to generate new image data between the pixels and thereby heighten the resolution. When the resolution of the input image data is higher than the printing resolution, on the contrary, the resolution conversion process skips the input image data at a predetermined ratio to lower the resolution. The resolution of the input image data is accordingly converted into the printing resolution.

After conversion of the resolution of the input image data into the printing resolution, the image data goes through a color conversion process (step S104). The color conversion process converts the RGB color image data expressed by combinations of tone values of the colors R, G, and B into image data expressed by combinations of tone values of respective colors used for printing. As mentioned above, the printer 200 prints an image with the four color inks C, M, Y, and K. The color conversion process of this embodiment accordingly converts the image data expressed by the tone values of the colors R, G, and B into image data expressed by the tone values of the four colors C, M, Y, and K.

Figure 6:
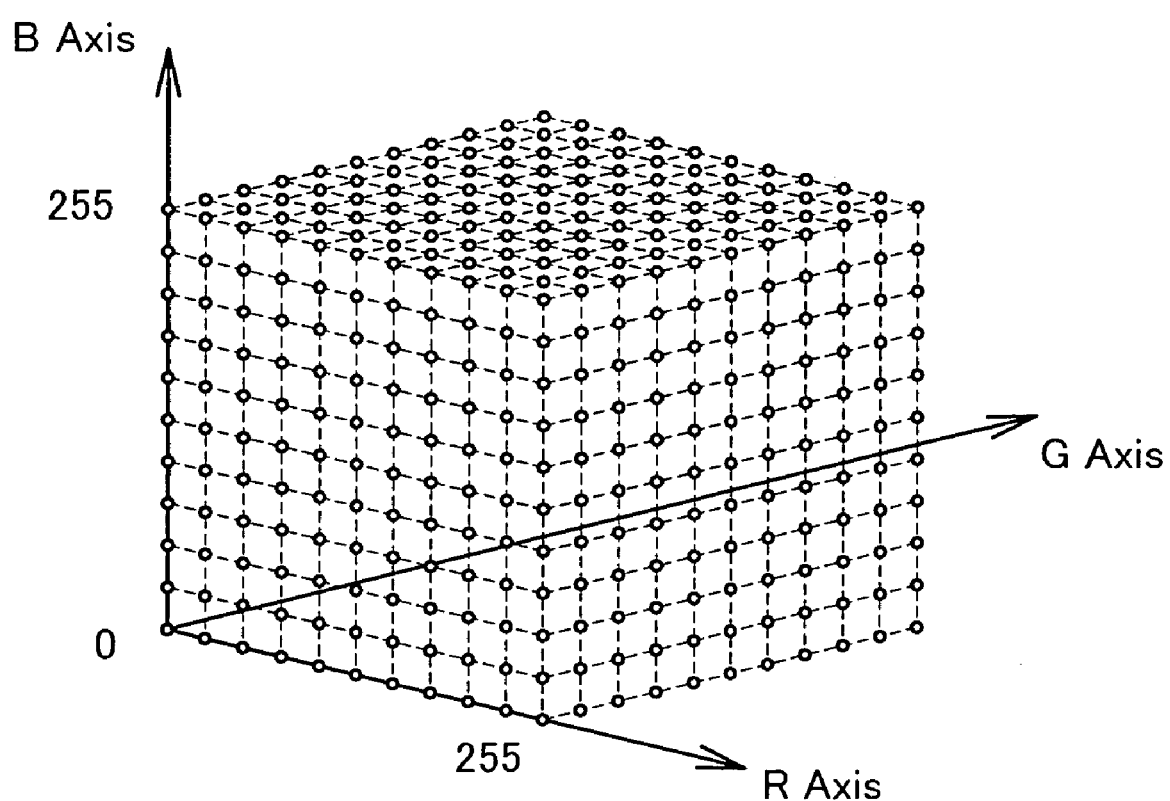
FIG. 6 conceptually shows a color conversion table that is referred to in a color conversion process.

Prompt color conversion is implemented by referring to a color conversion table (LUT). FIG. 6 conceptually shows the LUT that is referred to for the color conversion. The LUT is regarded as a three-dimensional numerical table as discussed below. There is a color space defined by three orthogonal axes, R, G, and B as shown in FIG. 6. Every RGB image data is expressible by one coordinate point in this color space. A large number of lattice points are set by subdivision of the respective R, G, and B axes in the color space, where each lattice point represents RGB image data. A combination of the tone values of the respective colors C, M, Y, and K corresponding to each RGB image data is mapped to each lattice point. The LUT is thus formed as the three-dimensional numerical table that stores a combination of the tone values of the respective colors C, M, Y, and K at each lattice point set in the color space. Reference to the storage of the LUT representing the mapping of the tone data of the respective colors C, M, Y, and K to the RGB color image data ensures prompt color conversion from the RGB color image data into tone data of the respective colors C, M, Y, and K.

After conversion into the tone data of the respective colors C, M, Y, and K, the computer 100 starts a dot on-off setting process (step S106). The image data obtained by the color conversion takes a tone value in a range of 0 to 255 with regard to each pixel, where the data length is 1 byte.

The inkjet printer expresses an image by formation of dots and is designed to take only one of the two states, 'dot-on' and 'dot-off', with regard to each pixel. The inkjet printer thus varies the density of dots created in each preset area to express a resulting printed image, instead of varying the tone values of the respective pixels. The dot on-off setting process determines the dot on-off state in the respective pixels to create dots at adequate densities corresponding to the tone values of the tone data.

Any of diverse techniques including an error diffusion method and a dither method is applicable to the dot generation at adequate densities corresponding to the tone values. The error diffusion method diffuses an error of tone expression, which arises in each pixel due to selection of either the dot-on state or the dot-off state, into unprocessed peripheral pixels and determines the dot on-off state in each object pixel to eliminate the sum of error divisions diffused from processed peripheral pixels to the object pixel. The fractions of error diffusion to unprocessed peripheral pixels are set in advance in an error diffusion matrix. The dither method compares the tone values of image data in the respective pixels with threshold values set at corresponding positions in a dither matrix and selects dot formation in pixels having the greater image data than the corresponding threshold values and non-dot formation in pixels having the smaller image data than the corresponding threshold values, so as to determine the dot on-off state in the respective pixels.

Both the dither method and the error diffusion method typically generate dots evenly throughout the image. The dot on-off setting process executed in the printer 200 of this embodiment, on the other hand, unevenly generates dots in the specified directions different from the scanning directions of the print head, in order to prevent deterioration of the picture quality due to the positional misalignment. The dot on-off setting process of the embodiment may adopt either the error diffusion method or the dither method. The details of the dot on-off setting process of the embodiment will be discussed later.

On completion of the dot on-off setting process, the computer 100 starts an interlacing process (step S108). The interlacing process takes into account the sequence of actual dot formation on the printing paper and rearranges the image data, which has been converted into the data representing the dot on-off state, in an order of transfer to the printer 200. The computer 100 outputs the resulting image data rearranged by the interlacing process as control data to the printer 200 (step S110).

The printer 200 receives the control data from the computer 100 and creates dots on the printing paper to give a resulting printed image. As described above with reference to FIG. 3, the printer 200 actuates the print head 241 to eject ink droplets and create ink dots, synchronously with the main scans and the sub-scans of the carriage 240 by activation of the carriage motor 230 and the paper feed motor 235.

Formation of ink dots at adequate positions on the printing paper is essential to give a high-quality printed image. Actuation of the print head 241 to eject ink droplets is accordingly synchronized with the main scans and the sub-scans of the carriage 240. There may be, however, still a slight difference between the actuation timing and the scan timing or a positioning error. Such a timing difference or positioning error leads to positional misalignment of dot formation and worsens the printing quality. The image processing technique of this embodiment thus intentionally generate dots in an uneven manner to minimize the potential adverse effects of the positional misalignment of dot formation on the picture quality and give a high-quality printed image. The dot on-off setting process characteristic of this embodiment is described in detail below.

D. Dot On-Off Setting Process

The following description is on the assumption that the dither method is adopted in the dot on-off setting process of this embodiment, although the error diffusion method is also available for the same purpose. The dither method compares the tone values of the image data in the respective pixels with the threshold values set at the corresponding positions in the dither matrix, as mentioned above.

Figure 7:
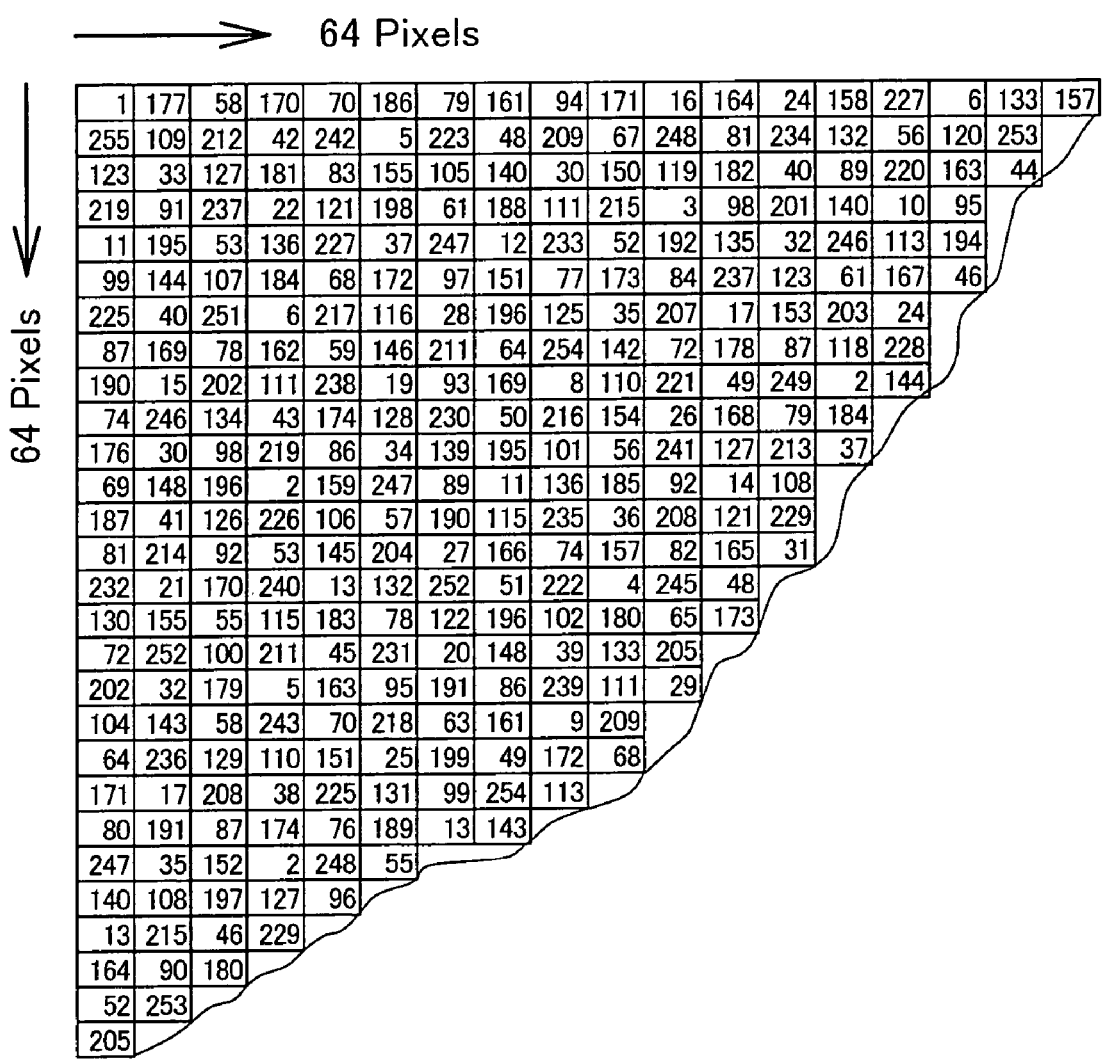
FIG. 7 shows part of a general dither matrix used in the dither method.

FIG. 7 shows part of a general dither matrix referred to in the dither method. This dither matrix stores threshold values, which are selected at random throughout a tone value range of 0 to 255 and are allocated to a total of 4096 pixels of 64 pixels in length and 64 pixels in width. In this embodiment, the image data are 1-byte data and the tone values allocated to the respective pixels are in the range of 0 to 255, so that the threshold values in the dither matrix are selected in the tone value range of 0 to 255. The dither matrix is not restricted to the size of 64 pixels in both length and width as in the example of FIG. 7, but may have any desired size having different numbers of pixels in length and in width or having the same numbers of pixels in both length and width.

Figure 8:
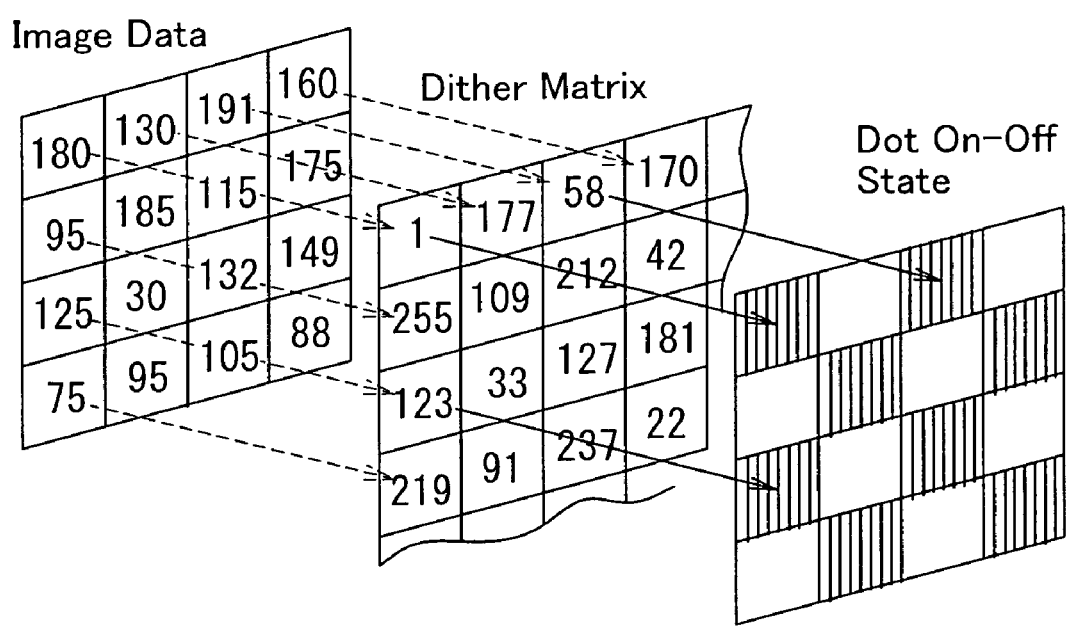
FIG. 8 conceptually shows a process of determining the dot on-off state of individual pixels by referring to the dither matrix.

FIG. 8 conceptually shows a process of determining the dot on-off state of individual pixels by referring to the dither matrix. The procedure of determining the dot on-off state first compares the tone value of the image data in each pixel selected as an object to be processed (target pixel) with a threshold value stored at the corresponding position in the dither matrix. Each arrow of thin broken line in FIG. 8 represents comparison between the tone value of each target pixel and a threshold value stored at the corresponding position in the dither matrix. When the tone value of the target pixel is greater than the corresponding threshold value in the dither matrix, the process determines dot formation in the target pixel. When the tone value of the target pixel is smaller than the corresponding threshold value in the dither matrix, on the contrary, the process determines no dot formation in the target pixel.

In the illustrated example of FIG. 8, the tone value allocated to a pixel on the upper left corner of image data is '180', while the threshold value stored at the corresponding position in the dither matrix is '1'. Since the tone value '180' of the image data is greater than the corresponding threshold value '1' in the dither matrix, the process determines dot formation in the pixel on the upper left corner. Each arrow of solid line in FIG. 8 represents a process of determining dot formation in a target pixel and writing the result of determination at a corresponding position in a memory. An adjoining pixel on the right side of the upper left pixel has the tone value '130', while the corresponding threshold value in the dither matrix is '177'. The threshold value is greater than the tone value, so that the process determines no dot formation in this pixel. The dither method refers to the dither matrix and successively generates dots in this manner.

The dot on-off setting process of this embodiment (step S106 in FIG. 5) refers to the dither matrix and determines the dot on-off state of the respective pixels to create dots in a similar manner to the general dither method described above. The dither matrix referred to in the dot on-off setting process of this embodiment, however, does not include threshold values simply set at random but stores threshold values set unevenly in a special rule as described later. This specifically designed dither matrix attains uneven dot distribution.

The terminology 'uneven dot distribution' is explained below, together with the advantage of the uneven dot distribution to prevent deterioration of the picture quality even in the event of the positional misalignment of dot formation.

Figure 9:
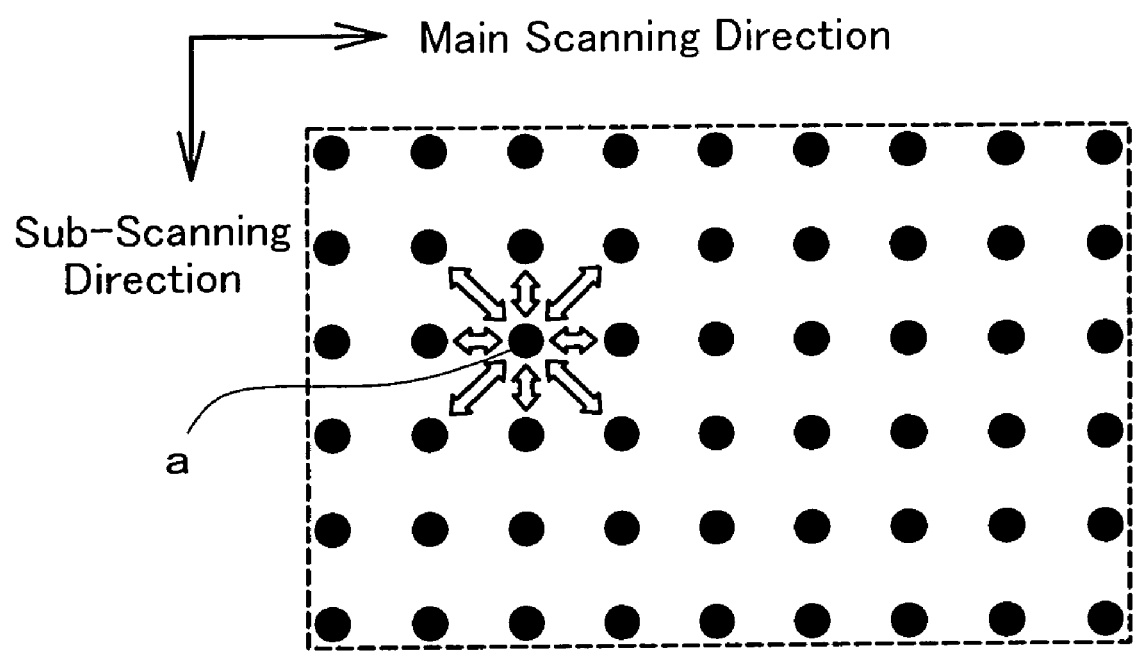
FIG. 9 shows one example of uneven dot distribution.
Figure 10:
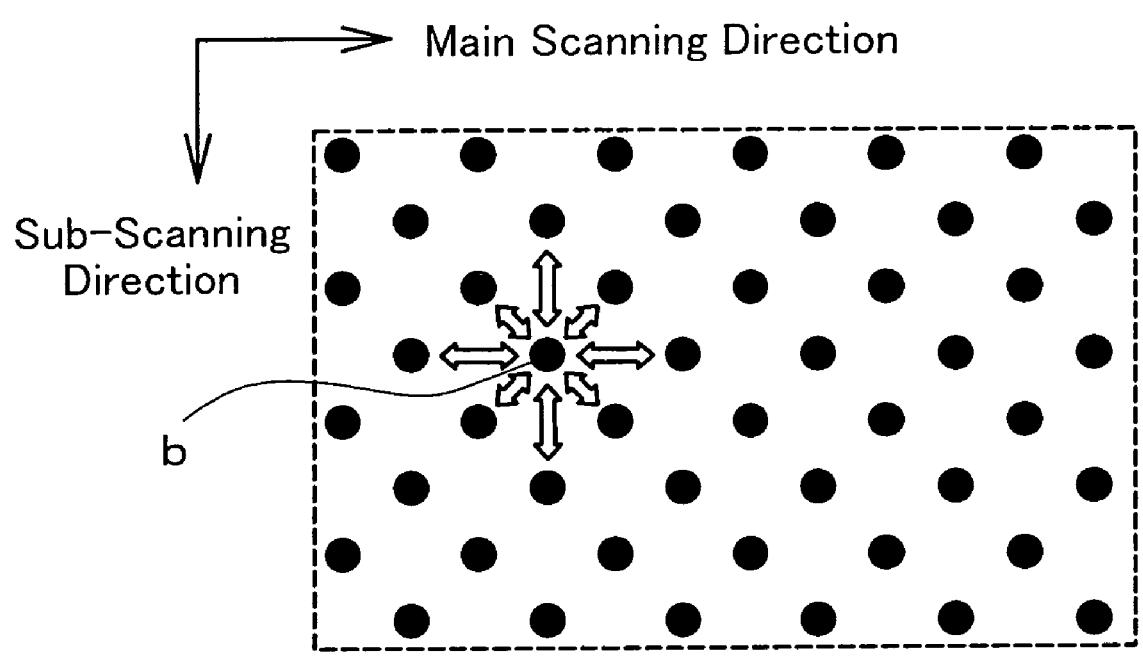
FIG. 10 shows another example of uneven dot distribution.

FIGS. 9 and 10 show examples of uneven dot distribution. In the example of FIG. 9, dots are generated evenly at a fixed density over the whole area, and there is no specific denser dot formation area. Each dot is, however, at different distances from its adjoining dots of various directions.

For example, an object dot 'a' in FIG. 9 has eight adjoining dots. These eight adjoining dots are not at substantially equal distances from the object dot 'a'. The adjoining dots in the main scanning direction and in the sub-scanning direction are closer to the object dot 'a' than the adjoining dots in the directions of 45 degrees from the main scanning direction and from the sub-scanning direction. This characteristic of the relatively shorter dot interval in the main scanning direction and in the sub-scanning direction and the relatively longer dot interval in the directions of 45 degrees from the main scanning direction and from the sub-scanning direction is not restricted to the object dot 'a' but is applied to any dot of FIG. 9. In the state of FIG. 9, dots are created not evenly in all the eight directions but unevenly, that is, a relatively higher density of dot generation in the main scanning direction and in the sub-scanning direction and a relatively lower density of dot generation in the directions of 45 degrees from the main scanning direction and from the sub-scanning direction.

In the illustrated example of FIG. 9, all dots share the characteristic of the object dot 'a', that is, denser dot generation in the main scanning direction and in the sub-scanning direction and sparser dot generation in the directions of 45 degrees from the main scanning direction and from the sub-scanning direction. This is, however, not essential. Multiple dots may have different characteristics, instead of the identical characteristic. The requisite for uneven dot distribution is that the multiple dots have some determinable tendency as a whole. The determinable tendency of multiple dots as a whole is readily detectable by application of various techniques of statistical analysis, for example, application of two-dimensional Fourier analysis to the image for detection of a power spectrum or application of correlation analysis to the image for computation of an auto-correlation coefficient. The terminology 'uneven dot distribution' accordingly represents the state where dot generation in a certain area is not even in all the directions but is uneven to have higher densities in some directions and lower densities in other directions.

In the illustrated example of FIG. 10, dots are created unevenly to have a longer dot interval (that is, a lower dot density) in the main scanning direction and in the sub-scanning direction and a shorter dot interval (that is, a higher dot density) in the directions of 45 degrees from the main scanning direction and from the sub-scanning direction. The examples of FIGS. 9 and 10 accordingly have uneven dot distribution in different ways.

The concept of 'direction of weight' is introduced for discrimination between these two states. The state of denser dot generation in the main scanning direction (or in the sub-scanning direction), as in the example of FIG. 9, is expressed as 'weighted dot distribution in the main scanning direction (or in the sub-scanning direction)'. In the illustrated example of FIG. 10, dot distribution is weighted in the direction of 45 degrees from the main scanning direction or from the sub-scanning direction.

The examples of FIGS. 9 and 10 have uneven dot distribution in the different directions of weight and accordingly have different effects of the positional misalignment of dot formation on the resulting picture quality. The sparser dot generation in the main scanning direction or in the sub-scanning direction as in the example of FIG. 10 has less adverse effects of the positional misalignment of dot formation than the denser dot generation in the main scanning direction or in the sub-scanning direction as in the example of FIG. 9, as described below.

Figure 11A:
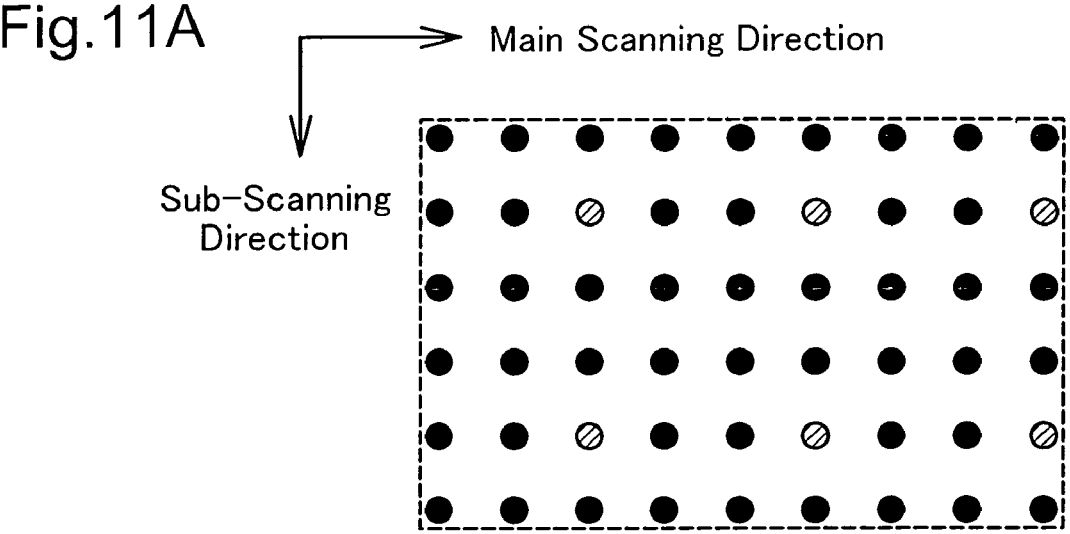
FIGS. 11A through 11C show effects of positional misalignment of dot formation on the resulting picture quality in the state of denser dot distribution in a main scanning direction or in a sub-scanning direction.
Figure 11B:
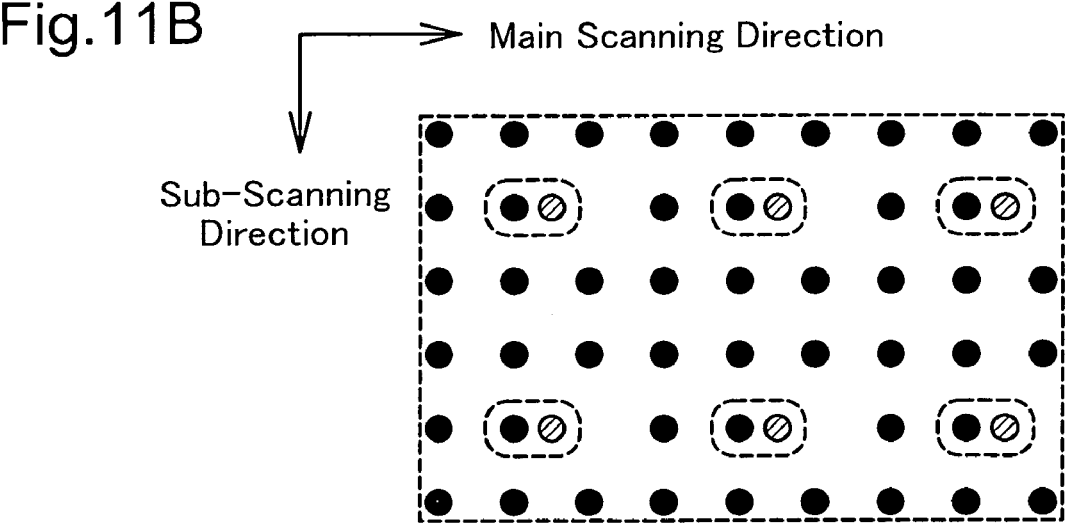

FIG. 11 shows effects of the positional misalignment of dot formation on the resulting picture quality in the state of weighted dot distribution in the main scanning direction or in the sub-scanning direction. The state of FIG. 11A has no positional misalignment of dot formation. It is assumed that six hatched dots of FIG. 11A are misaligned from their expected positions. In the similar manner to the illustrated example of FIG. 9, each of these six hatched dots is at relatively shorter distances from adjoining dots in the main scanning direction and in the sub-scanning direction. Since the dot interval is relatively short in the main scanning direction, the positional misalignment of dot formation in the main scanning direction further narrows the dot interval and makes dots rather conspicuous to worsen the resulting picture quality. In the state of FIG. 11B, the encircled areas of broken line show close formation of dots due to the positional misalignment. Although the individual dots are small and visibly unobservable, such blocks of dots may be conspicuous to give the rough touch and worsen the resulting picture quality.

Figure 11C:
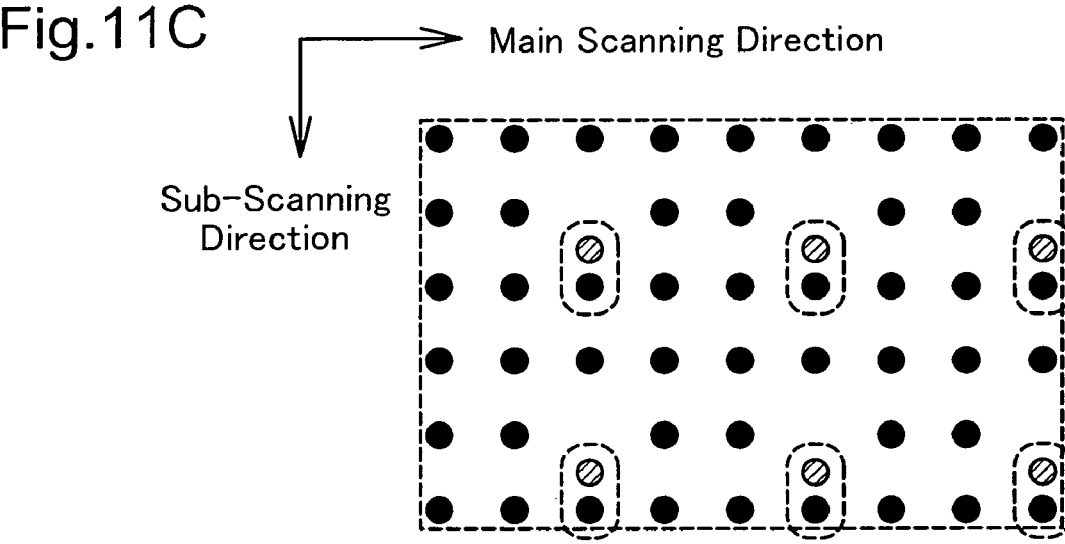

In the state of FIG. 11C, the six hatched dots are misaligned in the sub-scanning direction. Since the dot interval is relatively short in the sub-scanning direction as shown in FIG. 11A, the positional misalignment of dot formation in the sub-scanning direction further narrows the dot interval and may worsen the resulting picture quality. The encircled areas of broken line in FIG. 11C also show close formation of dots, which may lead to the poor picture quality.

As shown in FIG. 11, in the state of weighted dot distribution in the main scanning direction or in the sub-scanning direction, the positional misalignment of dot formation in the main scanning direction or in the sub-scanning direction often worsens the resulting picture quality. The printer 200 has some potential for positional misalignment of dot formation in the main scanning direction or in the sub-scanning direction, because of the following reason. As mentioned above with reference to FIG. 3, the printer 200 actuates the print head 241 synchronously with the scan of the carriage 240 in the main scanning direction to eject ink droplets and create dots on the printing paper. After formation of dots in the main scanning direction, the printer 200 feeds the printing paper in the sub-scanning direction and again actuates the print head 241 in synchronism with the scan of the carriage 240 in the main scanning direction to create dots at different positions. Some difference between the main scan timing of the carriage 240 and the ejection timing of ink droplets causes the positions of dots to be misaligned in the main scanning direction. An error of the paper feed causes the positions of dots to be misaligned in the sub-scanning direction. Namely the printer 200 has a potential for positional misalignment of dot formation in the main scanning direction or in the sub-scanning direction.

Because of the reason discussed above, in the state of denser dot generation in the main scanning direction or in the sub-scanning direction as shown in FIG. 11A, there may be areas of close dot formation to worsen the resulting picture quality.

In the state of weighted dot distribution in the different direction from the main scanning direction or from the sub-scanning direction, on the other hand, there is a significantly less potential for the worsened picture quality. This is discussed with reference to FIG. 12, which conceptually shows weighted dot distribution in the directions of 45 degrees from the main scanning direction and from the sub-scanning direction. The weighted dot distribution in the different directions from the main scanning direction and from the sub-scanning direction consequently causes sparser dot generation in the main scanning direction and in the sub-scanning direction.

Figure 12A:
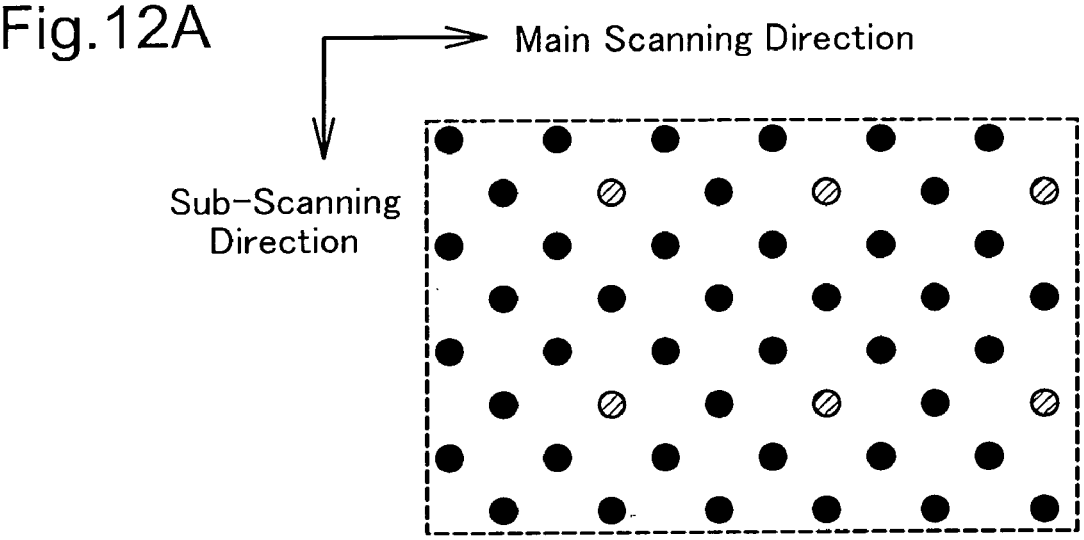
FIGS. 12A through 12C show effects of positional misalignment of dot formation on the resulting picture quality in the state of sparser dot distribution in the main scanning direction or in the sub-scanning direction.

The state of FIG. 12A has no positional misalignment of dot formation. It is assumed that six hatched dots of FIG. 12A are misaligned from their expected positions. Each of these six hatched dots is at relatively longer distances from adjoining dots in the main scanning direction and in the sub-scanning direction. Some positional misalignment of dot formation in the main scanning direction does not narrow the dot interval enough to make the dots conspicuous. In a similar manner, since the dot interval is relatively long in the sub-scanning direction, some positional misalignment of dot formation in the sub-scanning direction does not narrow the dot interval enough to make the dots conspicuous.

Figure 12B:
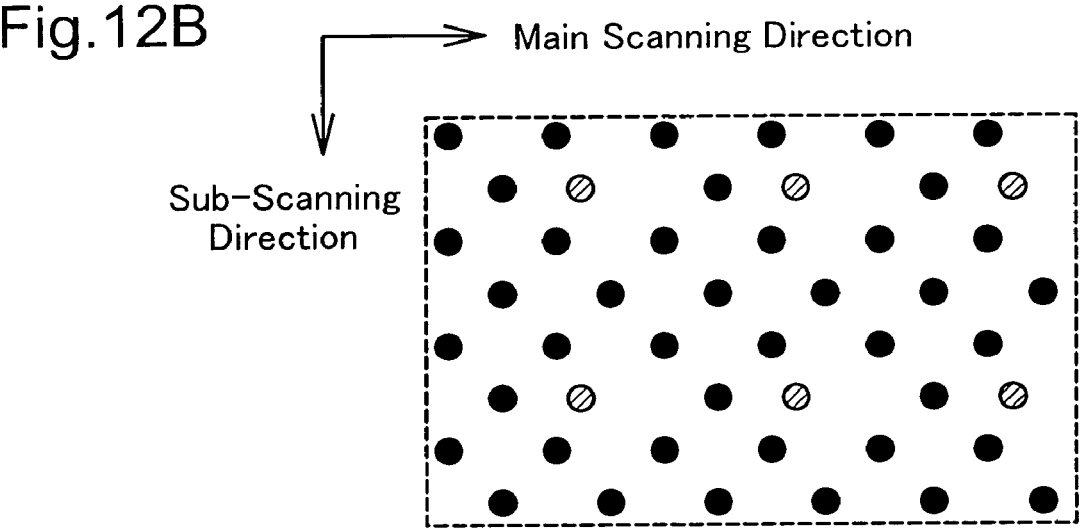
Figure 12C:
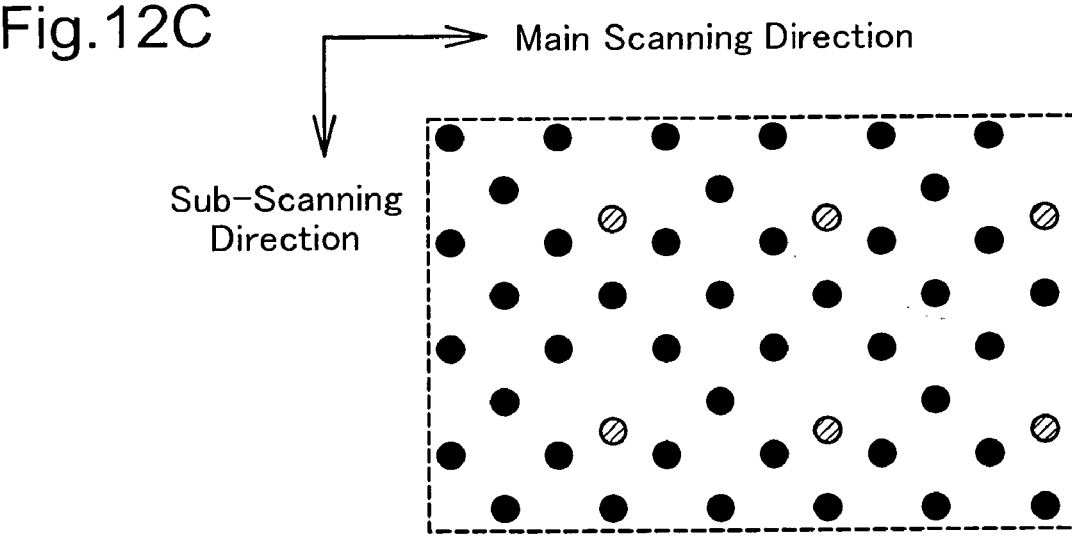

FIG. 12B shows misalignment of the positions of the hatched dots in the main scanning direction, and FIG. 12C shows misalignment of the positions of the hatched dots in the sub-scanning direction. As clearly understood from the comparison between FIG. 12B and FIG. 11B and between FIG. 12C and FIG. 11C, there are no close dot formation areas to make the dots conspicuous in the state of FIG. 12, unlike the encircled areas of FIG. 11. As shown in FIG. 12, in the state of sparser dot generation in the main scanning direction and in the sub-scanning direction, some positional misalignment of dot formation in the main scanning direction or in the sub-scanning direction does not significantly affect the resulting picture quality.

In the state of FIG. 12, dot generation is sparser in the main scanning direction and in the sub-scanning direction, while being denser in the directions of 45 degrees from the main scanning direction and from the sub-scanning direction. In the state of FIG. 11, on the contrary, dot generation is denser in the main scanning direction and in the sub-scanning direction, while being sparser in the directions of 45 degrees from the main scanning direction and from the sub-scanning direction. Positional misalignment of dot formation in the direction of 45 degrees accordingly has different effects on the resulting picture quality.

Figure 13A:
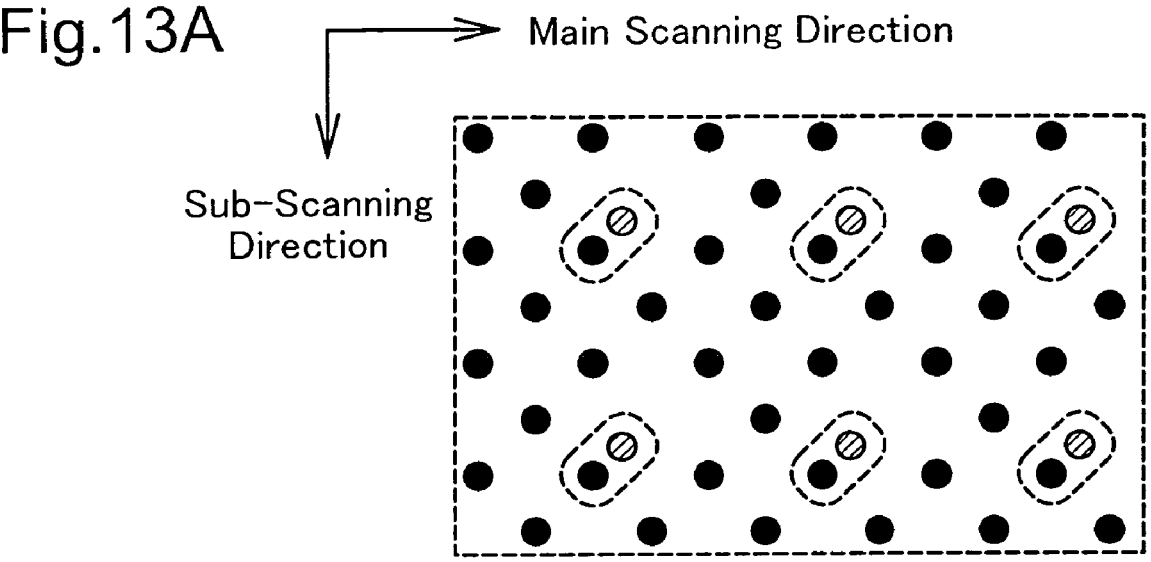
FIGS. 13A and 13B show positional misalignment of dot formation in a direction of 45 degrees from the main scanning direction or from the sub-scanning direction.
Figure 13B:
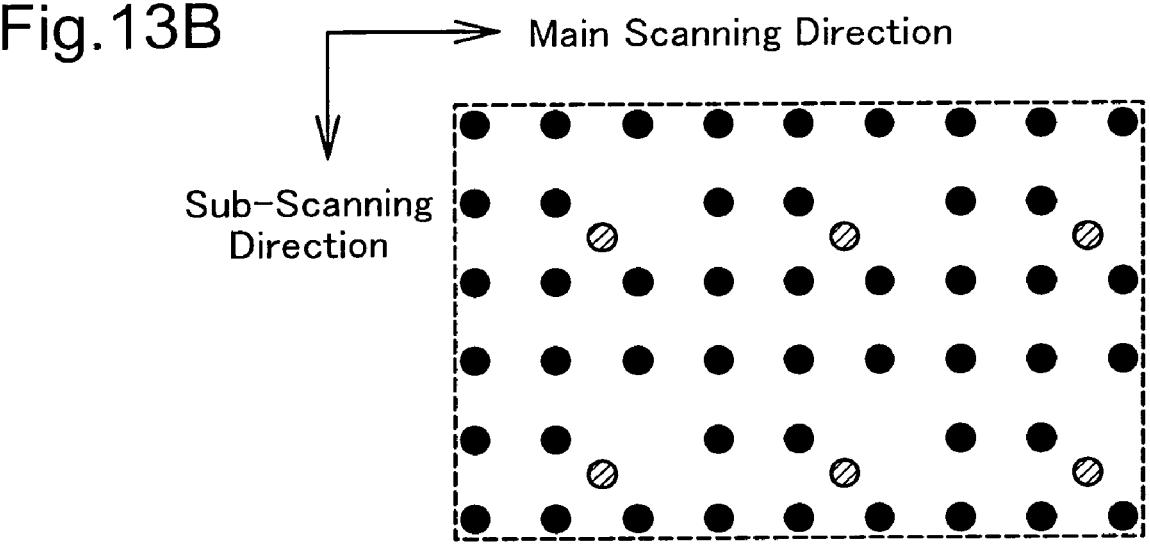

FIG. 13 shows positional misalignment of dot formation in the direction of 45 degrees from the main scanning direction or from the sub-scanning direction. The state of FIG. 13A is equivalent to the state of FIG. 12 where dot generation is sparser in the main scanning direction and in the sub-scanning direction, while being denser in the directions of 45 degrees from the main scanning direction and from the sub-scanning direction. The state of FIG. 13B is, on the other hand, equivalent to the state of FIG. 11 where dot generation is denser in the main scanning direction and in the sub-scanning direction, while being sparser in the directions of 45 degrees from the main scanning direction and from the sub-scanning direction. Positional misalignment of dot formation in the direction of 45 degrees makes the dots rather conspicuous and has the greater adverse effects on the resulting picture quality in the state of weighted dot distribution in the directions of 45 degrees from the main scanning direction and from the sub-scanning direction, compared with the state of weighted dot distribution in the main scanning direction and in the sub-scanning direction.

There is, however, a significantly less possibility of positional misalignment of dot formation in the direction of 45 degrees than positional misalignment of dot formation in the main scanning direction or in the sub-scanning direction. The positional misalignment of dot formation in the direction of approximately 45 degrees means simultaneous and substantially equivalent misalignment of the positions of dots in both the main scanning direction and the sub-scanning direction. The positional misalignment of dot formation in the main scanning direction or in the sub-scanning direction is not highly probable. There is accordingly an extremely low possibility of simultaneous and substantially equivalent positional misalignment in both the main scanning direction and the sub-scanning direction.

As described above, in the printer 200 that executes main scans and sub-scans to create dots, the weighted dot distribution in the different directions from the main scanning direction and from the sub-scanning direction effectively prevents the resulting picture quality from being worsened by some positional misalignment of dot formation and assures a printed image of sufficiently high picture quality.

E. Dither Matrix Generation Process

As described above, the computer 100 of this embodiment causes uneven dot distribution and makes dot generation sparser in the head scanning directions, that is, in the main scanning direction and in the sub-scanning direction, in order to prevent deterioration of the picture quality due to potential misalignment of the positions of dot formation by the printer 200. Such uneven dot distribution is attained by using a specifically designed dither matrix that includes threshold values set unevenly in a special rule, instead of the general dither matrix that includes threshold values simply set at random. The process of generating this specifically designed dither matrix is described below.

FIG. 14 is a flowchart showing a process of generating a specifically designed dither matrix to attain uneven dot distribution.

The dither matrix generation process first sets a power spectrum in a two-dimensional frequency space (step S200). Prior to the details of this processing, the technique of analyzing an image by two-dimensional Fourier transform is described briefly.

Figure 15A:
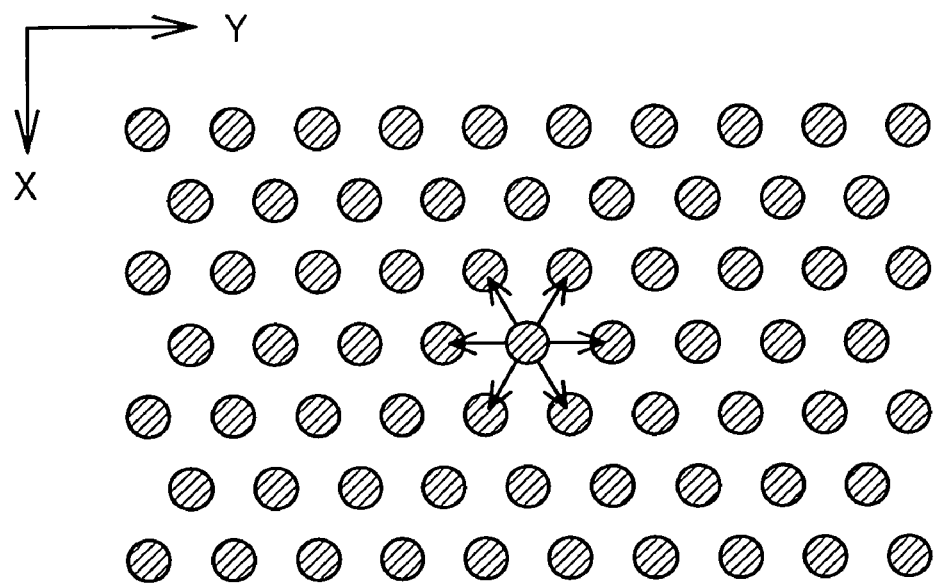
FIGS. 15A and 15B show the outline of image analysis by two-dimensional Fourier transform.

FIG. 15 shows the outline of image analysis by the two-dimensional Fourier transform. An image shown in FIG. 15A has periodicity in six different directions, which mutually intersect at the angles of 60 degrees. The periodicity of the image is evaluated by the two-dimensional Fourier transform.

The two-dimensional Fourier transform of the image may be regarded as simple expansion of one-dimensional Fourier transform to two dimensions. For example, the Fourier transform converts time-varying one-dimensional data, for example, a voltage waveform, into sinusoidal waves of diverse frequency components. The sinusoidal frequency components obtained by the Fourier transform are ascribed to the time-varying characteristic of the original voltage waveform. Namely the Fourier transform gives components having the dimensions of the reciprocal of original data to be converted. The Fourier transform of the time-varying data accordingly gives frequency components having the dimensions of the reciprocal of the time.

In a similar manner, the Fourier transform of distance-varying data gives wave number components or spatial frequency components having the dimensions of the reciprocal of the distance. The Fourier transform of data moderately varying with the distance increases the values of the lower spatial frequency components, whereas the Fourier transform of data abruptly varying with the distance increases the values of the higher spatial frequency components.

The image data is regarded as data varying in two dimensions (for example, directions X and Y) with the distance. This two-dimensional image data is accordingly subjected to Fourier transform in both the direction X and the direction Y. The two-dimensional Fourier transform gives spatial frequency components in the direction X with regard to the variation in the direction X, while giving spatial frequency components in the direction Y with regard to the variation in the direction Y. The two-dimensional Fourier transform of an image is thus equivalent to Fourier transform in the two different directions to give the spatial frequency components in the respective directions. Application of the two-dimensional Fourier transform to an image can thus evaluate the periodicity of the image.

Figure 15B:
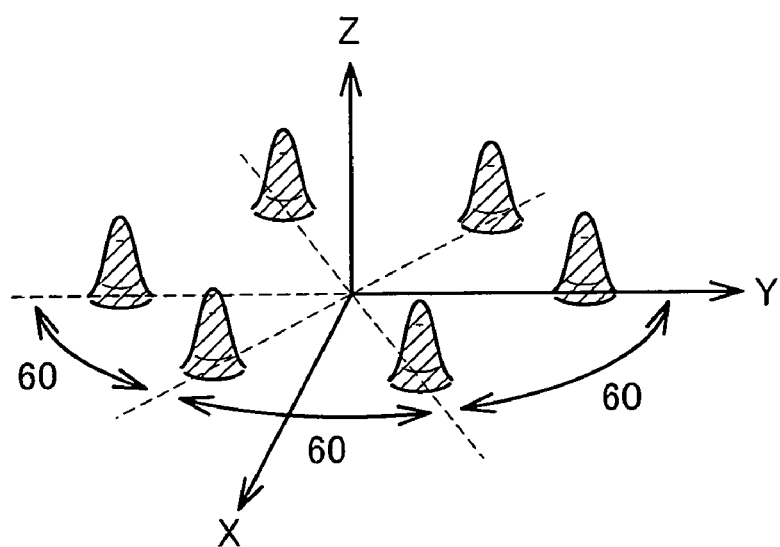

The image data shown in FIG. 15A have varying tone values with positional shifts in both the direction X and the direction Y. The two-dimensional Fourier transform of the image data accordingly gives spatial frequency components in the direction X and in the direction Y. FIG. 15B is a graph showing the magnitudes of the respective spatial frequency components thus obtained. Such a graph is often expressed as the power spectrum. In the graph of FIG. 15B, the spatial frequency in the direction X is plotted along the X axis, and the spatial frequency in the direction Y is plotted along the Y axis. In the specification hereof, the coordinate system showing the spatial frequency in the direction X along the X axis and the spatial frequency in the direction Y along the Y axis is called the two-dimensional spatial frequency coordinate system or simply the two-dimensional frequency space.

As mentioned above, the image of FIG. 15A has periodicity in the six different directions, which mutually intersect at the angles of 60 degrees. The power spectrum in the two-dimensional frequency space accordingly has six peaks. Since the original image prior to the Fourier transform has the periodicity in the six different directions, the six peaks of the power spectrum also appear in the six different directions at the angles of 60 degrees about the origin. The distance between the origin and each peak in the frequency space represents a spatial frequency component in each direction, and is related to the distance between adjoining dots in the corresponding direction on the original image prior to the Fourier transform. The shorter dot distance in the image of FIG. 15A gives a peak farther from the origin in the power spectrum, while the longer dot distance gives a peak closer to the origin in the power spectrum. The higher dot density in the image of FIG. 15 (that is, the greater tone value of the image data) gives the higher peak, and the greater dot diameter gives the broader peak. These characteristics show that a power spectrum obtained by Fourier transform of an original image in the two-dimensional frequency space is closely related to the original image. The inverse Fourier transform can thus recombine an original image from a power spectrum in the two-dimensional frequency space.

Figure 16:
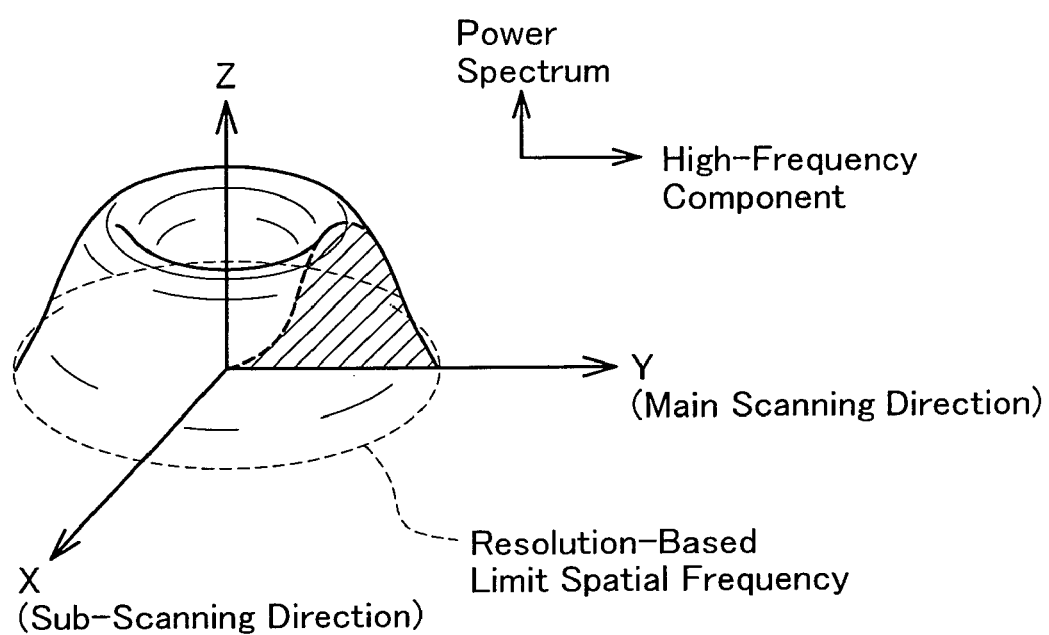
FIG. 16 conceptually shows a power spectrum obtained by two-dimensional Fourier transform of a general dither matrix conventionally used.

FIG. 16 conceptually shows a power spectrum obtained by two-dimensional Fourier transform of a general dither matrix conventionally used. As explained above, the dither matrix includes threshold values set in a matrix. The two-dimensional Fourier transform of these threshold values regarded as data gives a power spectrum of the dither matrix.

As mentioned above with reference to FIG. 15, the spatial frequency component of the power spectrum farther from the origin in the frequency space represents a shorter-cycle variation. The dither matrix does not have any variation of a shorter cycle than the pixel size. This means that the power spectrum of the dither matrix has a limit spatial frequency corresponding to the pixel size. The power spectrum is equal to '0' in a frequency domain higher than this limit spatial frequency. The dither matrix is designed to create dots as sparsely as possible, so that the power spectrum of the dither matrix has smaller values in a frequency domain of lower spatial frequencies. The power spectrum of the general dither matrix accordingly has a center-recessed cup shape as shown in FIG. 16. Inverse Fourier transform of a power spectrum set as shown in FIG. 16 in the two-dimensional frequency space can thus reconstruct a general dither matrix.

The processing of step S200 in the flowchart of FIG. 14 is explained on the premise of the above discussion. The dither matrix generation process sets a power spectrum in the two-dimensional frequency space as shown in FIG. 16. The general dither matrix is designed to create dots evenly in all the directions. The power spectrum obtained accordingly has a center recess equally dented in all the directions.

The dither matrix of this embodiment is, on the other hand, designed to create dots unevenly, that is, sparser dot generation in the main scanning direction and in the sub-scanning direction. As mentioned above, the sparser dot generation is equivalent to the farther distance between adjoining dots. The power spectrum set to have lower spatial frequencies in the main scanning direction and in the sub-scanning direction accordingly leads to the sparser dot generation in these directions. Namely the power spectrum is set to have a smaller center recess in the main scanning direction and in the sub-scanning direction, compared with the power spectrum of FIG. 16.

Figure 17A:
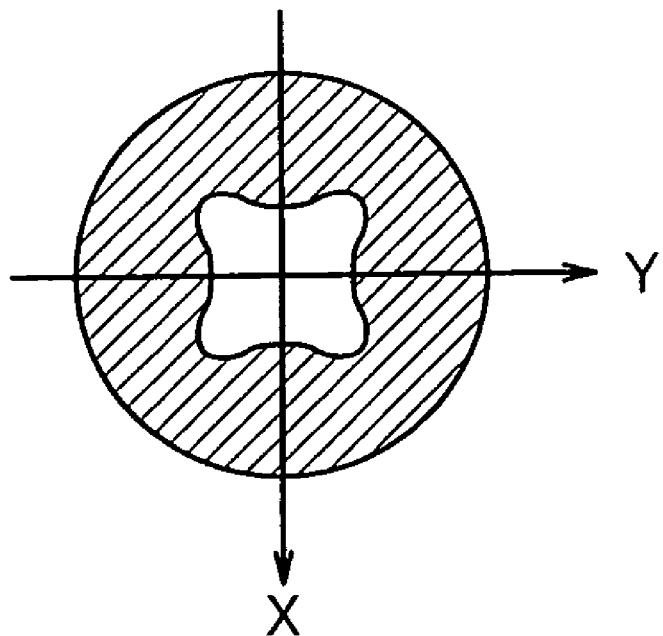
FIGS. 17A and 17B conceptually show the shapes of power spectra set in a dither matrix generation process of the embodiment.
Figure 17B:
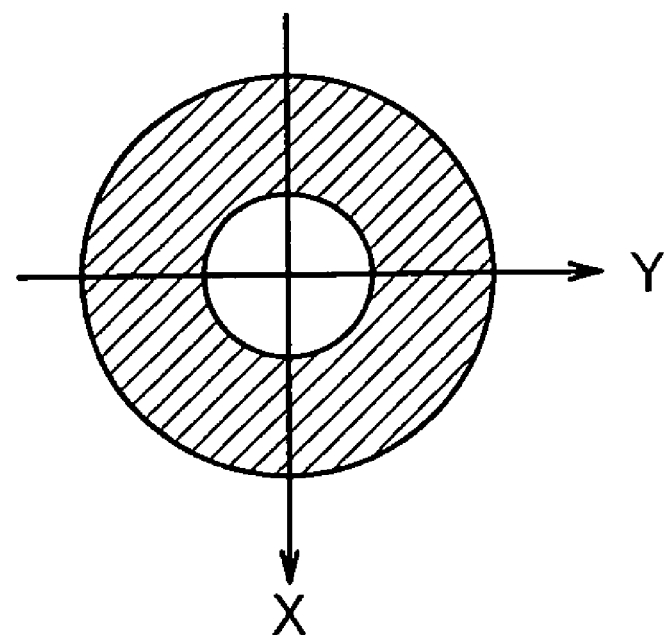

FIG. 17 conceptually shows the shape of the power spectrum thus obtained. For the clear illustration of the shape of the center recess, the power spectrum is cut on a plane parallel to the X-Y coordinate plane. FIG. 17A shows the cross section of the power spectrum of the dither matrix specifically designed to attain sparser dot generation in the main scanning direction and in the sub-scanning direction. For the purpose of comparison, FIG. 17B shows the cross section of the power spectrum of the general dither matrix shown in FIG. 16. The dither matrix generation process sets the power spectrum having the shape of FIG. 17A at step S200 in the flowchart of FIG. 14.

Inverse Fourier transform of the power spectrum set in the above manner constructs a specifically designed dither matrix (step S202). This specifically designed dither matrix attains sparser dot generation in the main scanning direction and in the sub-scanning direction.

Figure 18A:
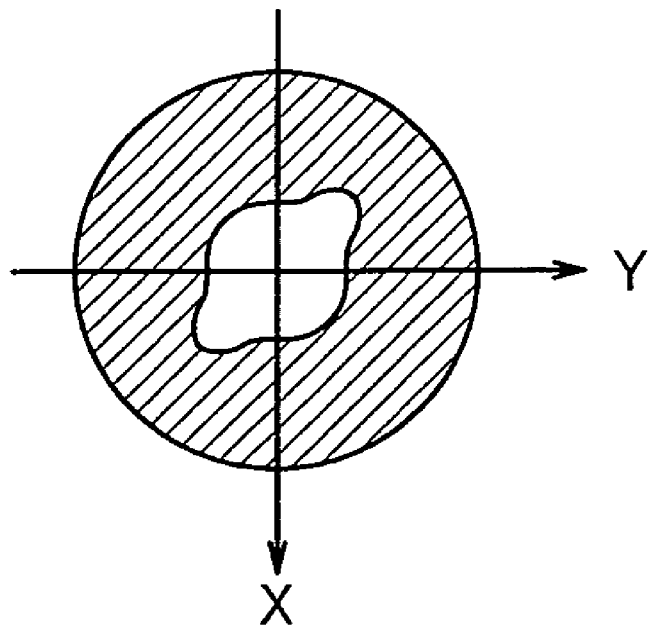
FIGS. 18A and 18B conceptually show other examples of power spectra set in the dither matrix generation process of the embodiment.
Figure 18B:
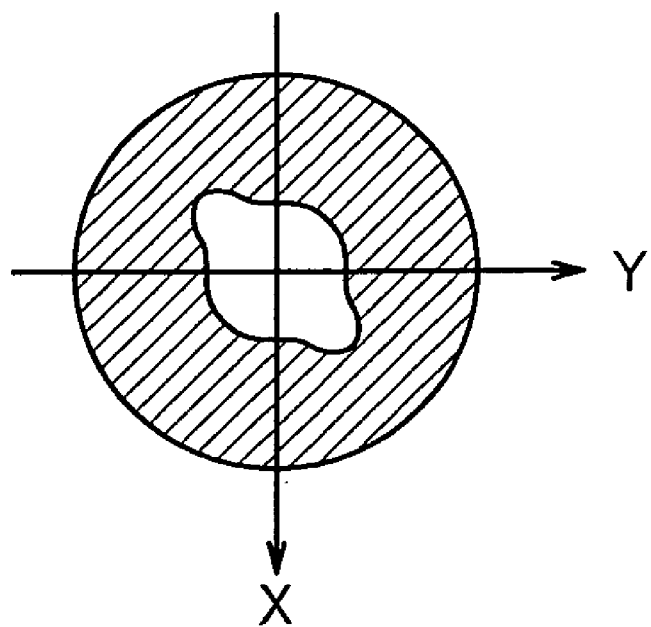

In the above example, the power spectrum is set to have the shape of FIG. 17A and goes through the inverse Fourier transform to give the specifically designed dither matrix. The shape of the power spectrum is, however, not restrictive at all. For example, as shown in FIG. 18A or FIG. 18B, the power spectrum may be set to have a larger center recess in a direction of +45 degrees from the main scanning direction or in a direction of −45 degrees from the main scanning direction. In the illustrated example of FIG. 18A, the power spectrum is set to place a greater weight on the higher frequencies in the direction of +45 degrees from the main scanning direction. The dither matrix constructed by inverse Fourier transform of this power spectrum gives denser dot generation in this direction (that is, in the direction of +45 degrees from the main scanning direction). The power spectrum set as shown in FIG. 18B, on the other hand, gives denser dot generation in the direction of −45 degrees from the main scanning direction. The denser dot generation in the direction of +45 degrees or in the direction of −45 degrees naturally leads to the sparser dot generation in the main scanning direction and in the sub-scanning direction.

The image processing of this embodiment shown in the flowchart of FIG. 5 refers to the dither matrix thus obtained to attain sparser dot generation in the main scanning direction and in the sub-scanning direction. The sparser dot distribution in the main scanning direction and in the sub-scanning direction does not deteriorate the picture quality even in the event of some positional misalignment of dot formation and assures the high-quality printed image.

In the above description, the power spectrum is obtained by two-dimensional Fourier transform. Fourier transform generally uses sine functions and cosine functions as basis functions. The basis functions are, however, not limited to the sine functions or the cosine functions. Wavelet transform using wavelet functions as the basis functions is also usable for the similar purposes and is applied to the procedure of the embodiment discussed above. In this modification, the procedure sets a power spectrum, which is obtained by wavelet transform, and generates a specifically designed dither matrix by inverse wavelet transform of the power spectrum. Dot generation with reference to this specifically designed dither matrix also does not deteriorate the picture quality even in the event of some positional misalignment of dot formation and assures the high-quality printed image.

F. Modifications

The image processing of the embodiment discussed above may be modified in various ways. Some examples of possible modification are described briefly.

F-1. First Modified Example

The procedure of the above embodiment sets an adequate power spectrum in the two-dimensional frequency space and generates a specifically designed dither matrix by inverse Fourier transform of the power spectrum. This method is, however, not essential, but another technique may be adopted to generate a dither matrix. For example, a distance function may be used to set a specifically designed dither matrix, which attains weighted dot distribution in different directions from the main scanning direction and from the sub-scanning direction (that is, sparser dot distribution in the main scanning direction and in the sub-scanning direction), as discussed below.

Figure 19A:
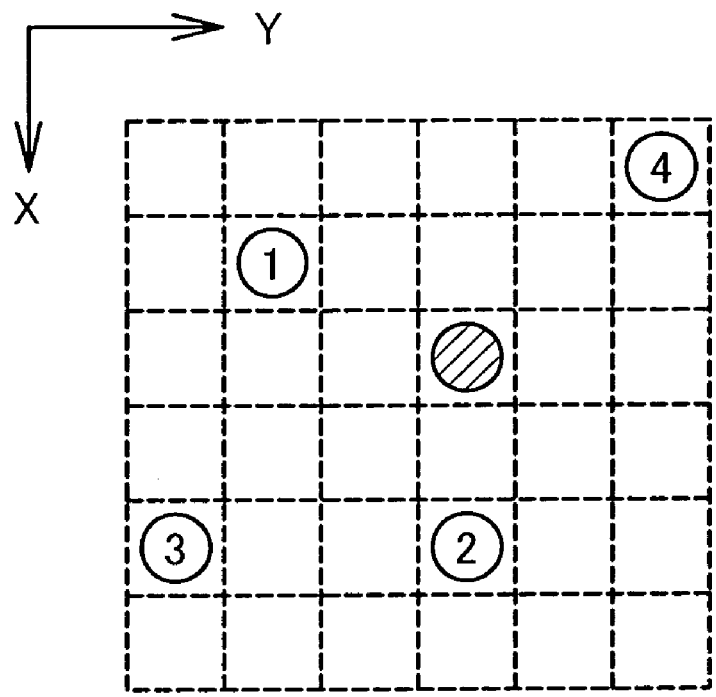
FIGS. 19A and 19B show a method of setting a dither matrix based on a distance function.

FIG. 19 shows a method of setting such a dither matrix based on a distance function. In the illustrated example of FIG. 19A, threshold values in a tone value range of 1 to 36 are sequentially set in a 6×6 dither matrix. This method successively positions each threshold value to maximize the sum of distances from previously located threshold values. The same dither matrix is applied repeatedly to adjoining areas. It is thus required to take into account the distances from the threshold values in the adjacent dither matrixes.

In the state of FIG. 19A, four threshold values have already been located, and a fifth threshold value is just being positioned. The threshold values have been set in four pixels among 36 pixels of the dither matrix, so that the fifth pixel is set in one of the remaining 32 pixels. The distance function-based method selects one pixel that has the maximum sum of distances from pixels occupied with threshold values among these remaining pixels and sets the fifth threshold value in the selected pixel. In the illustrated example of FIG. 19A, the method selects a pixel shown by a hatched circle and sets the fifth threshold value in this selected pixel. A sixth threshold value is then set in a selected pixel that has the maximum sum of distances from the pixels occupied with the threshold values including the pixel occupied with the fifth threshold value. The 36 threshold values are sequentially set in this manner. The resulting dither matrix includes threshold values dispersed evenly without any localization of large threshold values or small threshold values.

Figure 19B:
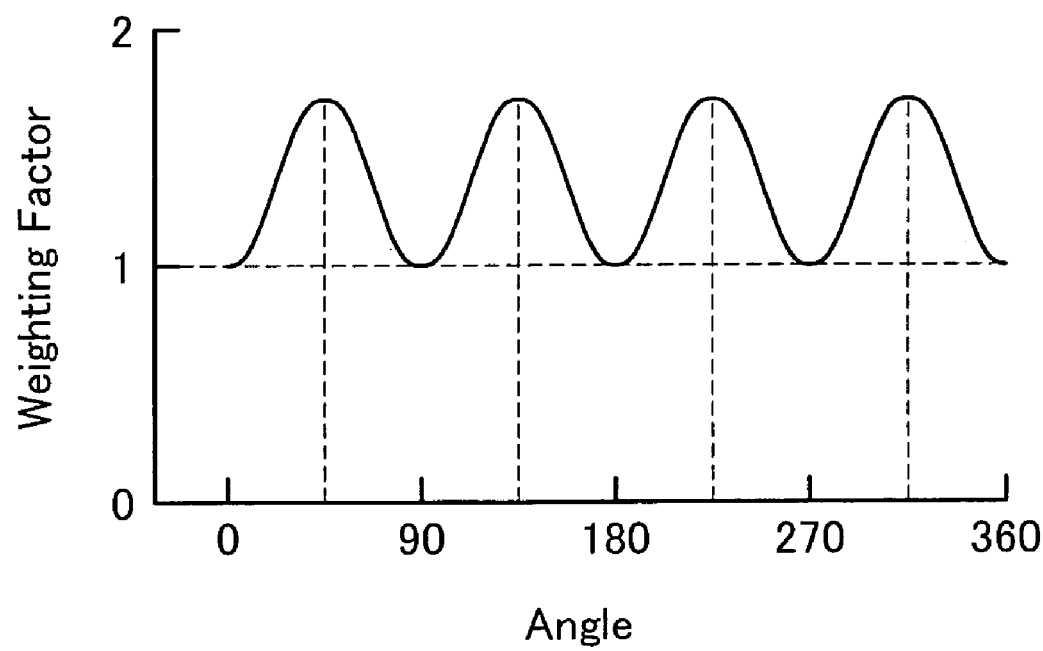

In order to set a dither matrix attaining uneven dot distribution, adequate weighting factors are applied to the distances in the respective directions. For example, weighting factors shown in FIG. 19B are used to set a dither matrix that attains sparser dot distribution in the main scanning direction and in the sub-scanning direction like the above embodiment. The abscissa of FIG. 19B shows the angle from the main scanning direction (corresponding to the direction of the Y axis in FIG. 19A). The distances between each remaining pixel and the pixels occupied with the threshold values are calculated and multiplied by the weighting factors set according to the direction as shown in FIG. 19B. A next threshold value is set in a selected pixel that has the maximum sum of the calculated and multiplied distances. For example, the weighting factors of FIG. 19B multiply the distances from the pixels in the directions of 45 degrees, 135 degrees, 225 degrees, and 315 degrees from the main scanning direction.

As described above, the pixel having the maximum sum of distances from the pixels occupied with the threshold values is selected for a next threshold value. The actual distances from the pixels are multiplied in the directions of the above four angles. This suggests the higher potential for early selection of pixels in these directions. Relatively large threshold values accordingly tend to be set in the other directions (that is, in the main scanning direction and in the sub-scanning direction). The dither matrix including the threshold values sequentially set in this manner gives sparser dot distribution in the main scanning direction and in the sub-scanning direction.

F-2. Second Modified Example

The procedure of the above embodiment refers to the dither matrix to create dots. The dither method is, however, not the restrictive technique of dot generation. The error diffusion method may alternatively be applicable to dot generation as discussed below as a second modified example.

FIG. 20 shows error diffusion matrixes usable in the error diffusion method. As described previously, the error diffusion method determines the dot on-off state of each object pixel and diffuses an error of tone expression arising due to selection of either the dot-on state or the dot-off state into unprocessed peripheral pixels. The dot on-off state of each unprocessed pixel is determined to eliminate the sum of error divisions diffused from the processed peripheral pixels. The error diffusion matrix sets the fractions of diffusion of the error arising in each object pixel into unprocessed peripheral pixels. The error diffusion method refers to the error diffusion matrix to diffuse the error of tone expression into unprocessed peripheral pixels.

The error diffusion method generally uses the error diffusion matrix shown in FIG. 20A to attain even dot distribution. Each square with a mark '*' represents an object pixel in FIG. 20. This error diffusion matrix diffuses a ¼ division of an error arising in the object pixel into a right pixel adjacent to the object pixel, while diffusing ⅛ divisions of the error into two pixels immediately below the object pixel. Namely this error diffusion matrix diffuses the error into unprocessed peripheral pixels in a substantially uniform manner. This leads to even dot distribution.

The error diffusion matrixes of FIGS. 20B through 20D are used, on the other hand, to attain uneven dot distribution. For example, the error diffusion matrix of FIG. 20B mainly diffuses the error arising in the object pixel into unprocessed peripheral pixels in the lateral direction (the main scanning direction) and in the vertical direction (the sub-scanning direction). As described above, the error diffusion method determines the dot on-off state of each pixel to eliminate the sum of error divisions diffused from the processed peripheral pixels. Diffusion of the error mainly in the main scanning direction and in the sub-scanning direction accordingly lowers the potential for dot generation in these directions. The error diffusion matrix of FIG. 20C mainly diffuses the error into unprocessed peripheral pixels in the main scanning direction and thereby lowers the potential for dot generation in the main scanning direction. The error diffusion matrix of FIG. 20D mainly diffuses the error into unprocessed peripheral pixels in the sub-scanning direction and thereby lowers the potential for dot generation in the sub-scanning direction.

The error diffusion method uses the error diffusion matrix shown in FIG. 20B to attain sparser dot distribution in both the main scanning direction and the sub-scanning direction, like the dot on-off setting process of the above embodiment. The error diffusion method may use the error diffusion matrix shown in FIG. 20C to attain sparser dot distribution in only the main scanning direction or may use the error diffusion matrix shown in FIG. 20D to attain sparser dot distribution in only the sub-scanning direction.

Selection of the adequate error diffusion matrix enables the error diffusion method to attain weighted dot distribution in the desired direction different from the main scanning direction or from the sub-scanning direction. As described previously with reference to FIGS. 11 through 13, this arrangement does not worsen the resulting picture quality even in the event of some positional misalignment of dot formation but ensures a high-quality printed image.

F-3. Third Modified Example

The density pattern method is also applicable to attain weighted dot distribution in the different directions from the main scanning direction and from the sub-scanning direction. This is described briefly as a third modified example.

For example, the density pattern method sets in advance dot patterns mapped to representative tone values of 4×4=16 pixels. The density pattern method may divide a selected pixel having a certain tone value into quarters in both the length and the width, that is, into 16 divisional pixels, and generate dots in divisional pixels at predetermined positions corresponding to the tone value. The density pattern method may alternatively determine a representative tone value based on the tone values of 16 pixels and generate dots in pixels at predetermined positions corresponding to the representative tone value.

FIG. 21 shows a mapping of tone values in the range of 1 to 16 to dot patterns. The density pattern method refers to this mapping to create dots at a density corresponding to a given tone value. In order to attain sparser dot distribution in the main scanning direction and in the sub-scanning direction, the dot patterns of FIG. 21 are set to have higher dot densities in the directions diagonal to the main scanning direction and in the sub-scanning direction. Application of the density pattern method to the whole image attains denser dot distribution as a whole in the directions diagonal to the main scanning direction and in the sub-scanning direction. The dot distribution is naturally sparser in the main scanning direction and in the sub-scanning direction.

F-4. Fourth Modified Example

In the structure of the above embodiment, the print head 241 moves linearly. The linear motion is, however, not essential. A print head having another motion is described briefly as a fourth modified example.

Figure 22:
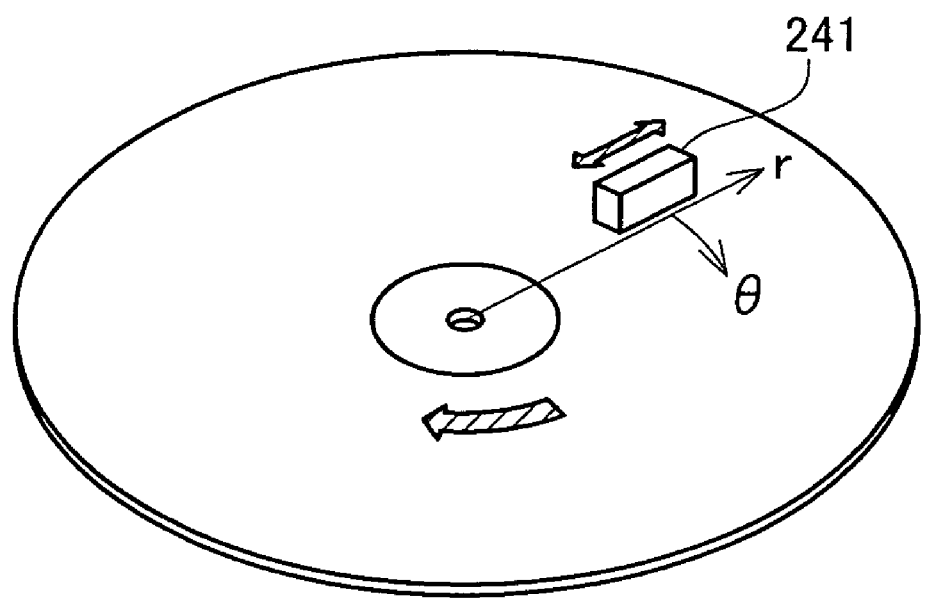
FIG. 22 shows formation of dots on a rotating disc.

In the fourth modified example of FIG. 22, the print head 241 moves in a radial direction of a rotating disc-shaped recording medium to record dots (or data) on the recording medium. The print head 241 and the recording medium relatively move in a direction of θ (circumferential direction) and in a direction of r (radial direction). Dot distribution is thus controlled to be sparser in these directions. This desirably prevents a possible positional misalignment from significantly affecting the resulting printing quality. This arrangement also reduces the adverse effects of a deviation of the data writing position on the recording medium.

The embodiment and its modified examples discussed above are to be considered in all aspects as illustrative and not restrictive. There may be many other modifications, changes, and alterations without departing from the scope or spirit of the main characteristics of the present invention. For example, the software programs (application programs) for actualizing the required functions of the invention may be supplied to a main memory or an external storage device of a computer system via a communication line and executed by the computer system. The software programs may otherwise be read from storage of CD-ROMs and flexible disks to be executed. The principle of the invention is also applicable to other printers, for example, laser printers and line printers.

What is claimed is:

1. An image processing apparatus that processes image data of multiple pixels constituting an image, said image processing apparatus comprising:
   a dot on-off setting module that determines dot on-off state in each pixel of the image to create dots at a preset density corresponding to a tone value of the image data in such a manner that a distribution of dots is to be weighted in a specific direction, which is different from a direction of raster lines aligned as arrays of dots; and
   a data supply module that supplies data representing positions of dots to be created as control data for dot formation to a printing module that actually creates dots.

2. An image processing apparatus in accordance with claim 1, further comprising:
   a printing module that creates dots on a printing media and is equipped with a print head that moves relative to a printing medium to create dots on the raster lines.

3. An image processing apparatus in accordance with claim 2, wherein said dot on-off setting module reduces a dot-on rate in a direction of relative motion of the print head to the printing medium, so as to attain uneven dot distribution.

4. An image processing apparatus in accordance with claim 2, wherein said dot on-off setting module attains weighted dot distribution in a direction of approximately 45 degrees from a direction of relative motion of the print head to the printing medium.

5. An image processing apparatus in accordance with claim 1, wherein said dot on-off setting module applies a dither method to the image data for dot generation.

6. A dither matrix used in an image processing apparatus in accordance with claim 5,
   said dither matrix including threshold values set to have a weight in a specific direction different from a direction of relative motion of the print head to the printing medium.

7. An image processing apparatus in accordance with claim 1, wherein said dot on-off setting module applies an error diffusion method to the image data for dot generation.

8. An error diffusion matrix used in an image processing apparatus in accordance with claim 7,
   said error diffusion matrix including weighting factors, which are used for error diffusion in the error diffusion method and are set to have a weight in a specific direction different from a direction of relative motion of the print head to the printing medium.

9. An image processing method that processes image data of multiple pixels constituting an image, said image processing method comprising:
   determining dot on-off state in each pixel of the image to create dots at a preset density corresponding to a tone value of the image data;
   setting a distribution of dots to be weighted in a specific direction that is different from a direction of raster lines aligned as arrays of dots; and
   supplying data representing positions of dots to be created as control data for dot formation to a printing module that actually creates dots.

10. A program product that causes a computer to attain an image processing method of processing image data of multiple pixels constituting an image, said program product comprising:
   a recording medium that records program codes therein; and
   program codes that are recorded in said recording medium,
   said program codes including:
   a first program code of determining dot on-off state in each pixel of the image to create dots at a preset density corresponding to a tone value of the image data;
   a second program code of setting a distribution of dots to be weighted in a specific direction that is different from a direction of raster lines aligned as arrays of dots; and
   a third program code of supplying data representing positions of dots to be created as control data for dot formation to a printing module that actually creates dots.

* * * * *